United States Patent [19]

Olsson

[11] 4,113,166

[45] * Sep. 12, 1978

[54] METHOD OF AND APPARATUS FOR CONVERTING MOLTEN METAL INTO SOLIDIFIED PRODUCTS

[76] Inventor: Erik A. Olsson, Rotfluhstrasse 15, 8702 Zollikon, ZH, Switzerland

[*] Notice: The portion of the term of this patent subsequent to Jul. 27, 1993, has been disclaimed.

[21] Appl. No.: 700,080

[22] Filed: Jun. 28, 1976

Related U.S. Application Data

[63] Continuation-in-part of Ser. No. 537,561, Dec. 30, 1974, Pat. No. 3,971,123, which is a continuation of Ser. No. 337,931, Mar. 5, 1973, abandoned.

[51] Int. Cl.² .................. B23K 19/00; B21C 37/04
[52] U.S. Cl. .................................... 228/170; 228/13; 228/18; 228/44.1 R; 228/47; 228/176; 228/190; 228/243; 164/49; 164/86; 164/109; 198/619
[58] Field of Search ............. 228/243, 13, 18, 44.1 R, 228/57, 158, 170, 176, 190; 164/86, 109, 110, 49; 198/619

[56] References Cited

U.S. PATENT DOCUMENTS

| | | | |
|---|---|---|---|
| 1,800,249 | 4/1931 | Evans | 164/86 |
| 2,234,214 | 3/1941 | Young | 228/190 X |
| 2,457,861 | 1/1949 | Brassert | 228/190 X |
| 3,542,116 | 11/1970 | Machlin | 164/86 |
| 3,754,634 | 8/1973 | Gerbig et al. | 198/619 X |
| 3,840,983 | 10/1974 | Ryff | 228/190 X |
| 3,971,123 | 7/1976 | Olsson | 29/527.7 |

*Primary Examiner*—James L. Jones, Jr.
*Assistant Examiner*—K. J. Ramsey
*Attorney, Agent, or Firm*—Parmelee, Miller, Welsh & Kratz

[57] ABSTRACT

An improvement in the process and apparatus for converting molten metal, especially steel, into a finished product by first converting the molten metal into thin layers which are superimposed on one another while hot and pressure welding the layers into a unitary body that is particularly adapted for hot or cold shaping into a final size and shape, with the advantage of accelerating the cooling of the molten metal and obtaining the improved grain structure and more nearly uniform distribution of alloying ingredients obtainable from rapid solidification of the molten steel to a solid, comprises forming several separate layers from a common heat of molten metal, simultaneously or successively pressure welding utilizing the layers into a unitary body in a single pressure welding station, in contrast to methods of and apparatus for producing a product from several layers requiring a separate casting unit for each separate layer or thickness and also requiring a pair of pressure rolls for each separate added layer or thickness in the finished product.

27 Claims, 21 Drawing Figures

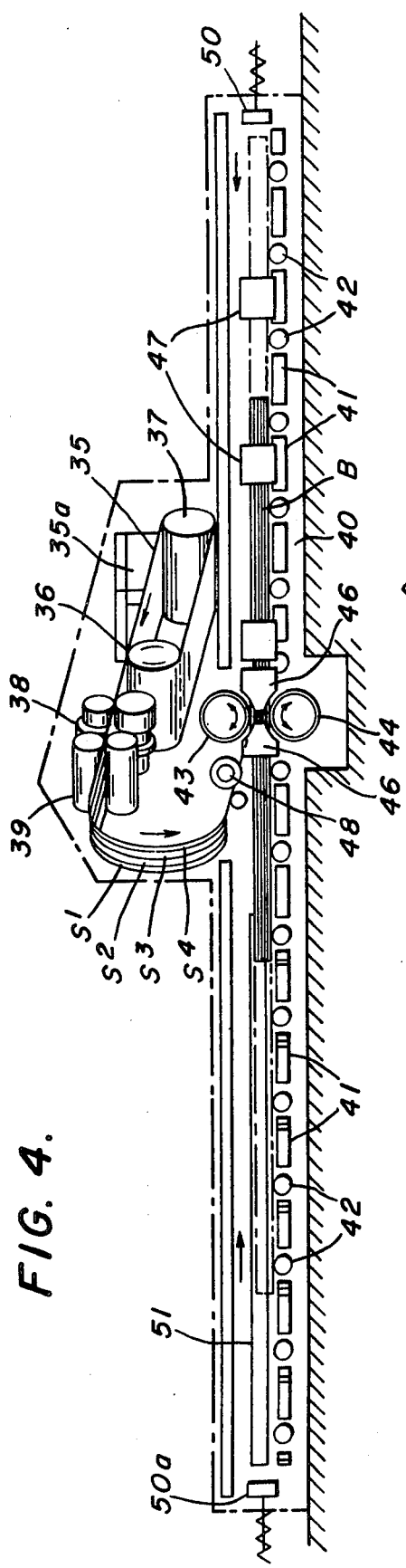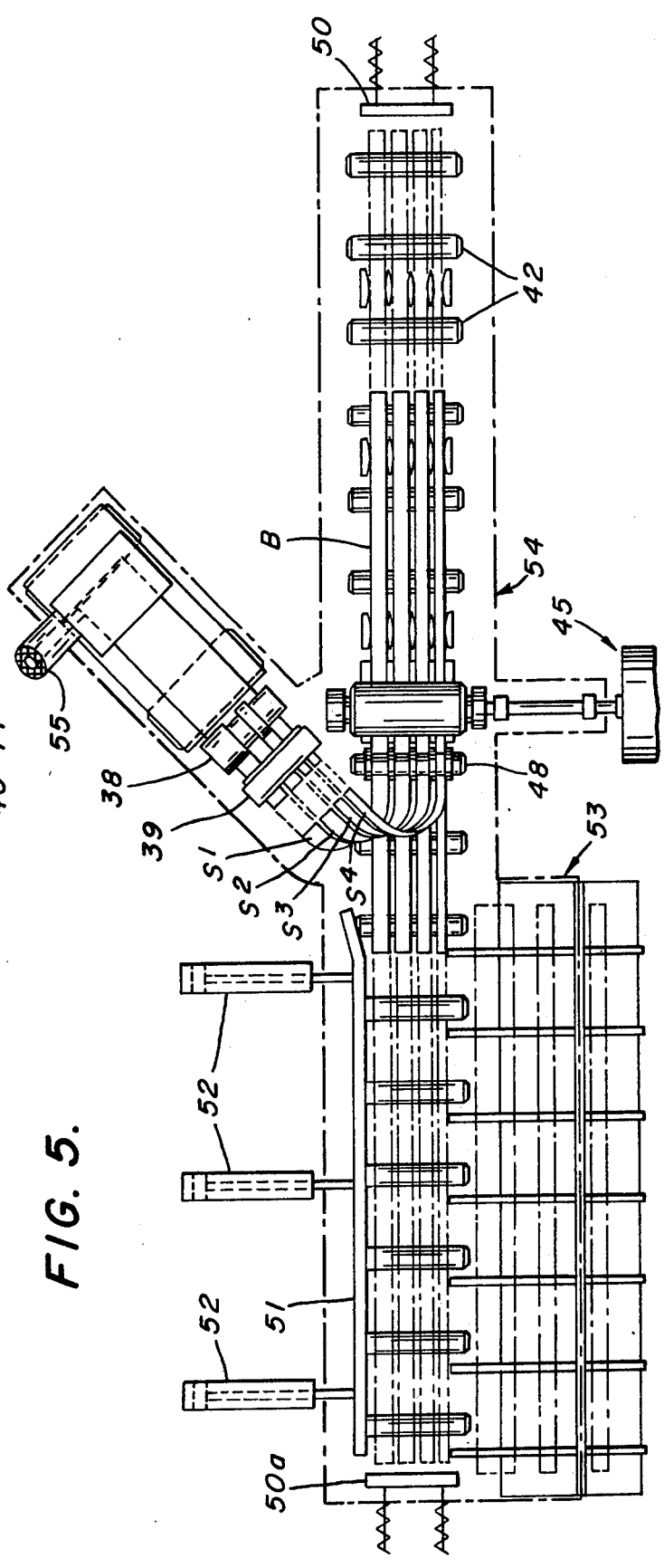
FIG. 4.
FIG. 5.

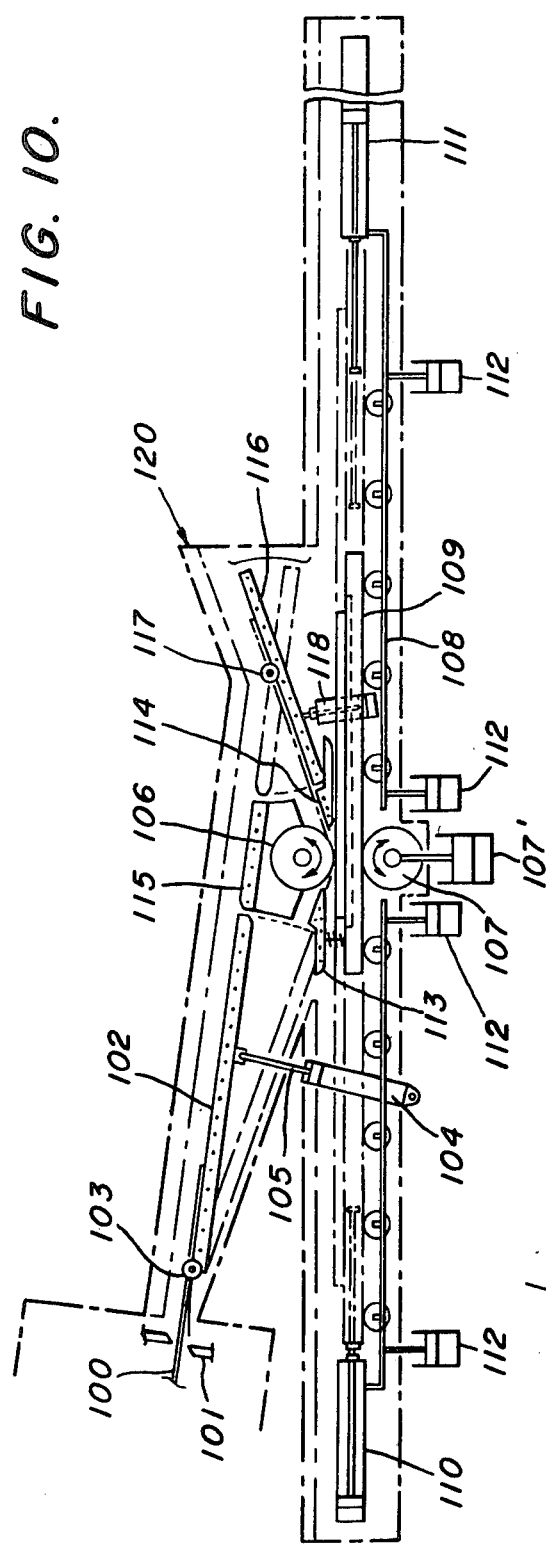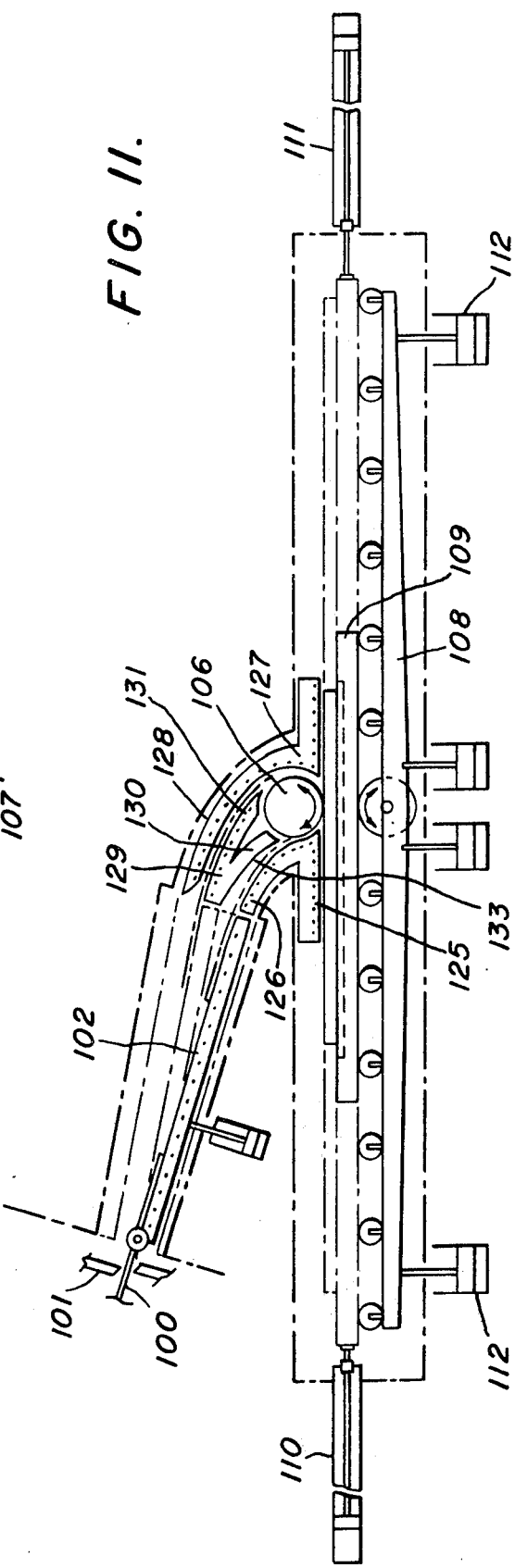

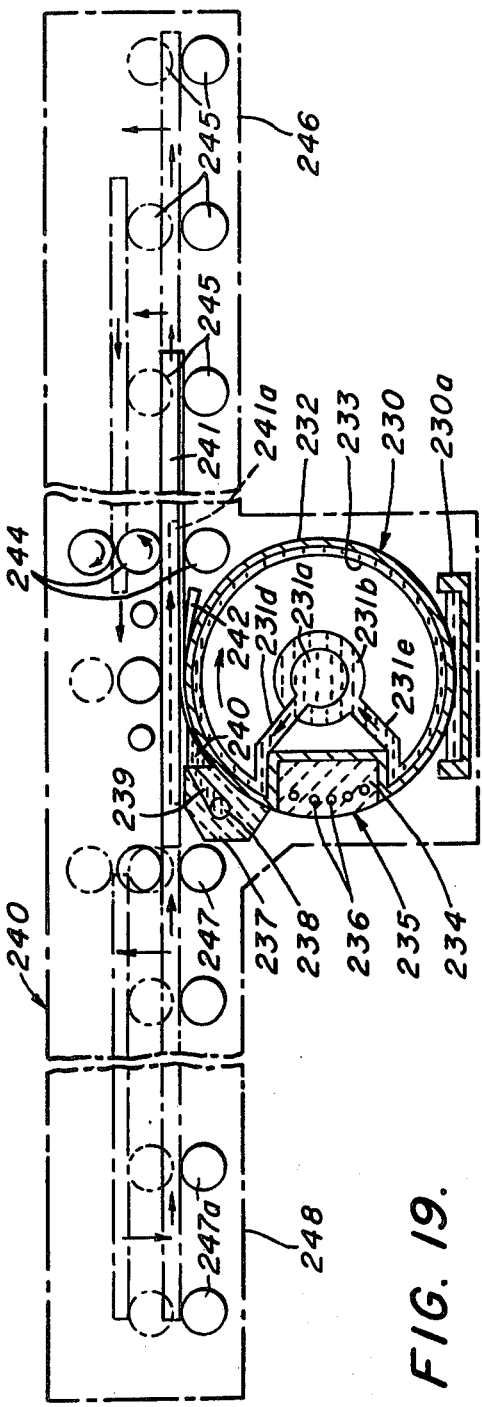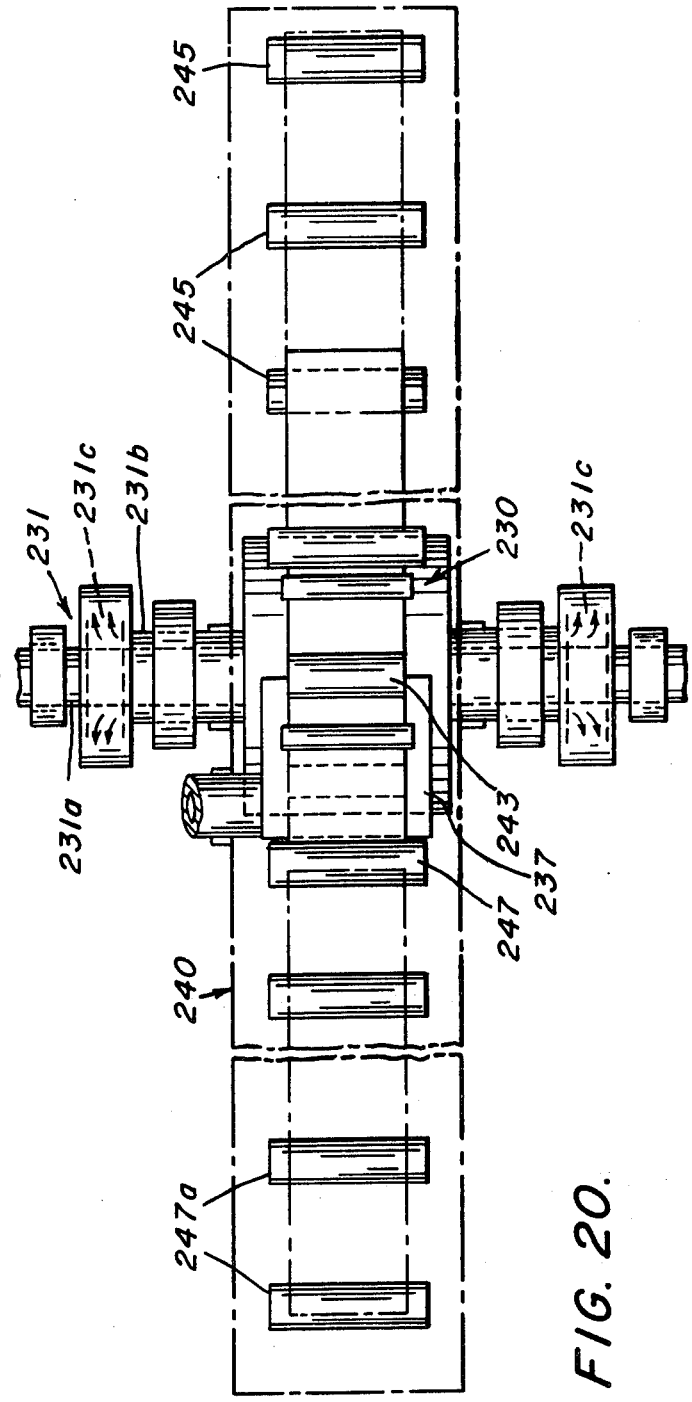
FIG. 19.
FIG. 20.

METHOD OF AND APPARATUS FOR CONVERTING MOLTEN METAL INTO SOLIDIFIED PRODUCTS

BACKGROUND OF THE INVENTION

This application is a continuation-in-part of my pending application Ser. No. 537,561 filed Dec. 30, 1974, now U.S. Pat. No. 3,971,123 granted July 27, 1976, as a continuation of application Ser. No. 337,931 filed Mar. 5, 1973, abandoned. So far as it may be relevant, said copending application is incorporated herein by reference.

In the usual process of casting molten metal, and particularly steel for the production of solid sections to be subsequently converted into finished products, as, for example, the process of continuous casting, the molten metal is charged into an open-ended mold where the molten metal entering the mold next to the cold mold walls solidifies to a skin which at first rapidly thickens as initial solidification continues. However, the rate of solidification progressively decreases as the solidification toward the center of the casting increases. The solidification time, "T", of a billet, whether it be round, square or rectangular, is usually expressed by the formula $T = kD^2$ where $k$ is a factor depending on cooling conditions and D is the diameter or thickness from one surface to the other and can be roughly approximated as proportional to the square of the diameter or thickness.

It is, of course, well known that when molten metal, particularly steel, solidifies rapidly, the casting has a fine grain structure while the quick solidification prevents or minimizes segregation of some elements, as, for example, alloying elements in steel, but slower solidification leads to larger or coarser and less desirable grain structure with accompanying rejection by the crystals as they form of some of the alloying elements, as well as "impurities," (which, in the case of steel may include S, P, AS, ZN, SN, etc.) and their resulting concentration in the area of the casting last to solidify. As a result, the outer portion of the casting, often referred to as "the chill zone layer" is superior from the standpoint of its fine grain structure, and also because it most nearly corresponds to the composition of the melt from which it was produced. To more nearly approach a uniformity of section across a conventionally cast ingot, from either a mold or continuous casting, heat-treating, rolling and forging operations are necessary which would not be necessary if a chill zone composition and structure prevailed across the entire section of the ingot.

In my pending application Ser. No. 337,931, there is disclosed a method wherein several continuously formed thin strands, or parallel portions of a single strand, are continuously brought together in face-to-face contact at a solidus temperature desirably above a usual hot rolling temperature but where liquid metal is not visible. When light pressure less than that required for deforming the solidified metal is applied to the contacting surfaces, fusing or welding occurs by intercrystalline diffusion which takes place under these conditions. This may be referred to as "flowless welding" or "pressure welding."

Thus, when forming a billet for example of diameter D according to this method of combining several individual layers or strands, the solidification time, being based on the thickness of the individual layers, is accelerated, so that the formula, instead of being expressed as expressed above, $T = kD^2$ will be approximately only $T = K(D)^2/(S)$, where S designates the number of layers. In pressing together a number of strands to effect welding, there is, at least in most cases, a reduction in thickness of the order of no more than about 2% so that to secure the dimension D this reduction of thickness must be taken into consideration in determining the dimension D of the finished casting. In other words, a ton of thin metal solidifying in separate layers from a molten condition solidifies much more rapidly than a ton of metal cast as a single casting into a billet or slab of the dimension D.

With perhaps two or three separate layers or strands being combined into a semifinished product, as disclosed in my copending application, the formation of each separate layer using separate casting rolls for each layer is commercially practical, even with a separate pressure roll means for each additional layer over two, but with perhaps four, five or even ten or more layers being combined into a single slab or billet, the complication and space requirements for a plant having a separate casting unit for each layer together with pressure roll passes for each layer above two layers, and the investment involved in such a plant rapidly offsets the economy and advantages of the process of my earlier application.

BRIEF DESCRIPTION OF THE INVENTION

The present invention involves a method of and apparatus for converting molten metal, especially steel, into a finished product where the molten metal is cast into thin layers by contacting a moving chill surface with molten metal against which a thin layer of the metal solidifies, either as a succession of separate pieces or as a continuous wide flat strip that is cut into lengths or strips and these are delivered to a single layering or stacking unit where they are brought together with a common means for pressure welding them progressively as they are placed one layer against another. There may, in some cases, be optionally employed two casting units, but their output will be compacted and one layer fused to the next in a common pressure welding unit.

The grain structure and composition of a thin layer cast in the manner herein disclosed is determined at the time a chilled layer forms on a moving chill surface and the combining of several layers into a common product, such as a billet or slab, slowing down the rate of heat transfer from the thicker product, is of little, if any, consequence at this time.

In the following description, the term "strand" is used to designate the emerging casting, whether continuously or intermittently produced on a cold surface moving in contact with a body of molten metal resulting in a solidified layer which is thereafter stripped from the moving cold or chill surface. It is desirably about 3 mm. thick and has the fine grain structure and uniform composition, for all practical purposes, of the melt from which it is formed and which is ofter referred to as being of chill zone thickness. The term "strip" is used, unless otherwise indicated, to designate division formed by slitting the strand longitudinally, and the terms "piece" or "pieces" or "lengths" designate individual pieces formed by cutting a strand or strip crosswise or formed in fixed lengths in the casting unit. The output of a complete unit, whatever the shape or size, is generally designated "product," "unitary product," or "semifinished product."

Where several strands are being simultaneously cast and combined as in my original application, a higher rate of production can be achieved than with the herein disclosed improvement, assuming dimensions to be the same, because several strands are being simultaneously produced and combined into a semifinished product. However, the improvement herein disclosed will nevertheless result in a rate of conversion of liquid metal into a billet or slab faster than the same tonnage could be secured by conventional continuous or semicontinuous casting. This results from the exponential increase in solidification speed with decreased thickness of the solidifying product.

Taking as an example, if 1 meter wide and 150 mm. thick steel slabs are being made by fusing together 3 mm. thick layers, this thickness will be achieved in approximately 1 second. Using a traveling belt conveyor as a chilling wall which, over a length of 1 meter is brought in contact with liquid steel, the belt speed can be 1 meter per second for withdrawing said 3 mm. thick solidified layer. This corresponds to a production of approximately 1,400 kg. per minute. To achieve this figure by conventional continuous casting in one strand, a rather sophisticated and expensive continuous casting machine would be required, considering that it would take about 6 minutes to get the section completely solidified at a minimum withdrawing speed of 1.24 meter per minute, giving an interior liquid pool of at least 7.5 meter length. During this time the strand has to be properly cooled and supported over this length. On the contrary, the method according to a simple embodiment of this invention needs a rather short traveling belt or a rotating drum, a shear for cutting the layer or strand to desired lengths after leaving the belt, and means stacking them one upon another along with means for pressing the stacked lengths as they are progressively added onto the top of a previous layer or layers. An even higher production rate would be obtained if the strand as cast is kept thinner while the length over which the belt is in contact with the liquid steel is again only 1 meter. Theoretically, 1 mm. thick layer would enable a withdrawal speed of approximately 540 meters per minute (due to the exponential increase of solidification rate with decreased thickness) corresponding to approximately 4 tons per minute. This productivity is hardly achievable at continuous casting with present casting techniques where there would be a liquid pool of approximately 21 meters at a casting speed of approximately 3.5 meters per minute. If the width of the layer or strand would be split longitudinally into 100 mm. wide strips to be fused together into 100 mm. sq. billets, an output of the order of about 54 meter billets per minute would be theoretically achieved.

One primary advantage of the invention is that all of the layers that are integrated into a single section in this manner are provided on a single moving chill surface and one body of molten metal. However, if desired, sections cut alternately from one casting unit may be interleaved with sections formed and cut from another and also a section formed on a single casting unit may be alternately or successively stacked on different castings being simultaneously formed.

Little change-over is required in a wide machine to simultaneously produce a plurality of narrower semifinished castings of the same or of different widths at the same time.

The invention may be more fully explained in conjunction with the accompanying drawings where certain specific embodiments of apparatus for and methods of practicing my invention are disclosed and in which.

Figure 6:
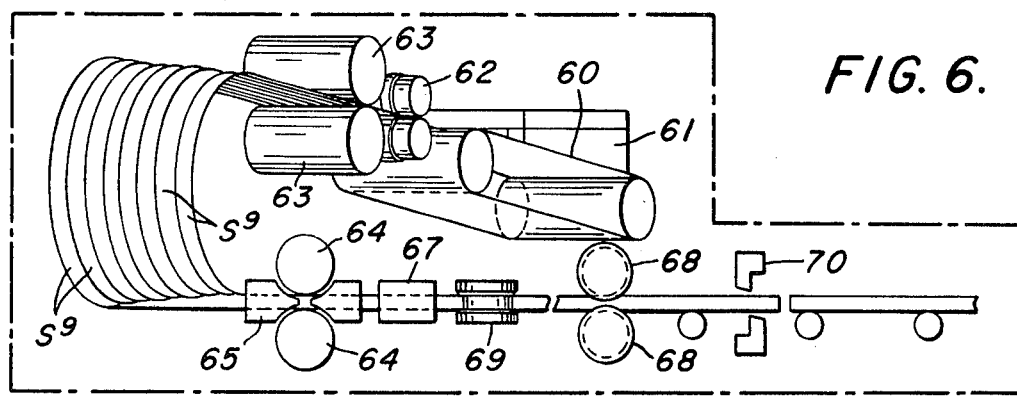
Figure 7:
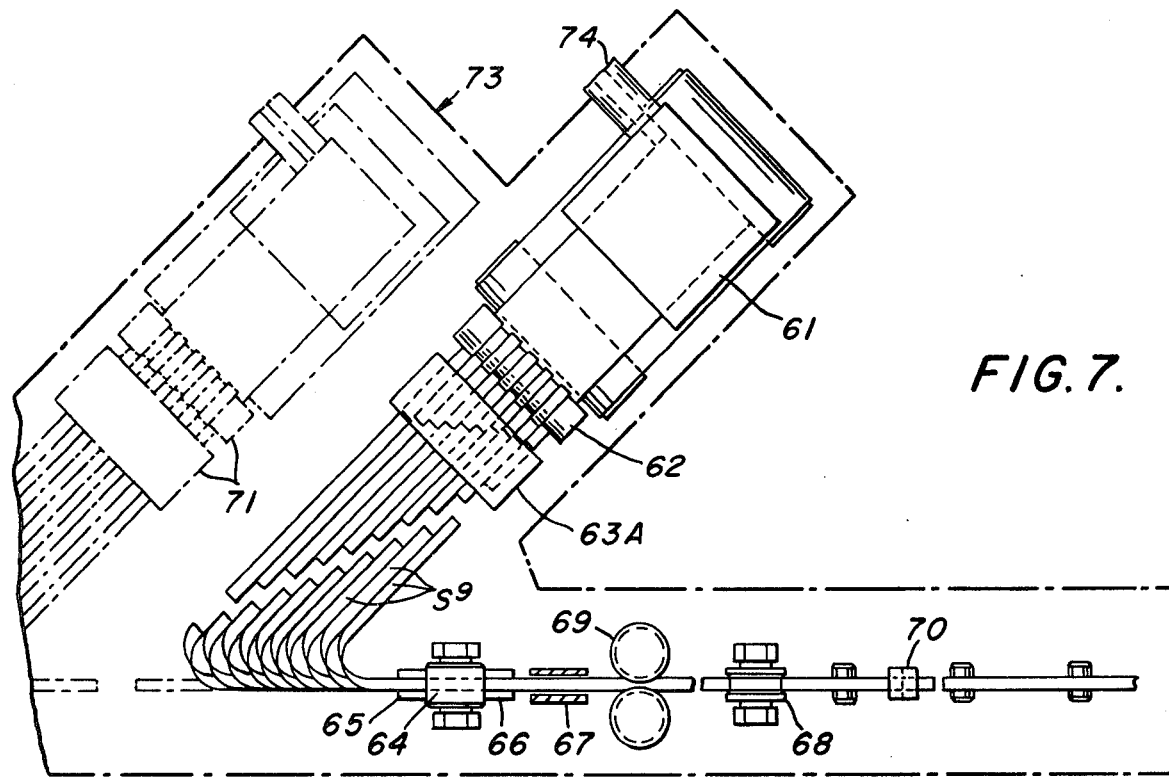
Figure 8:
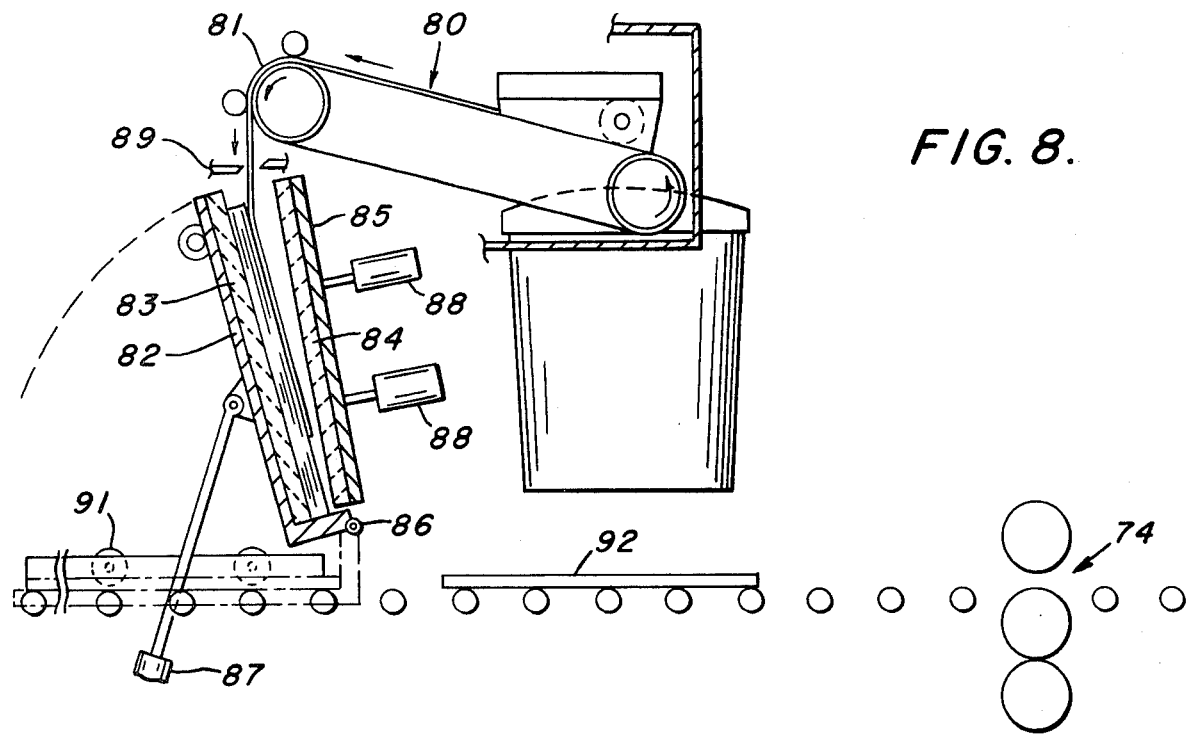
Figure 9:
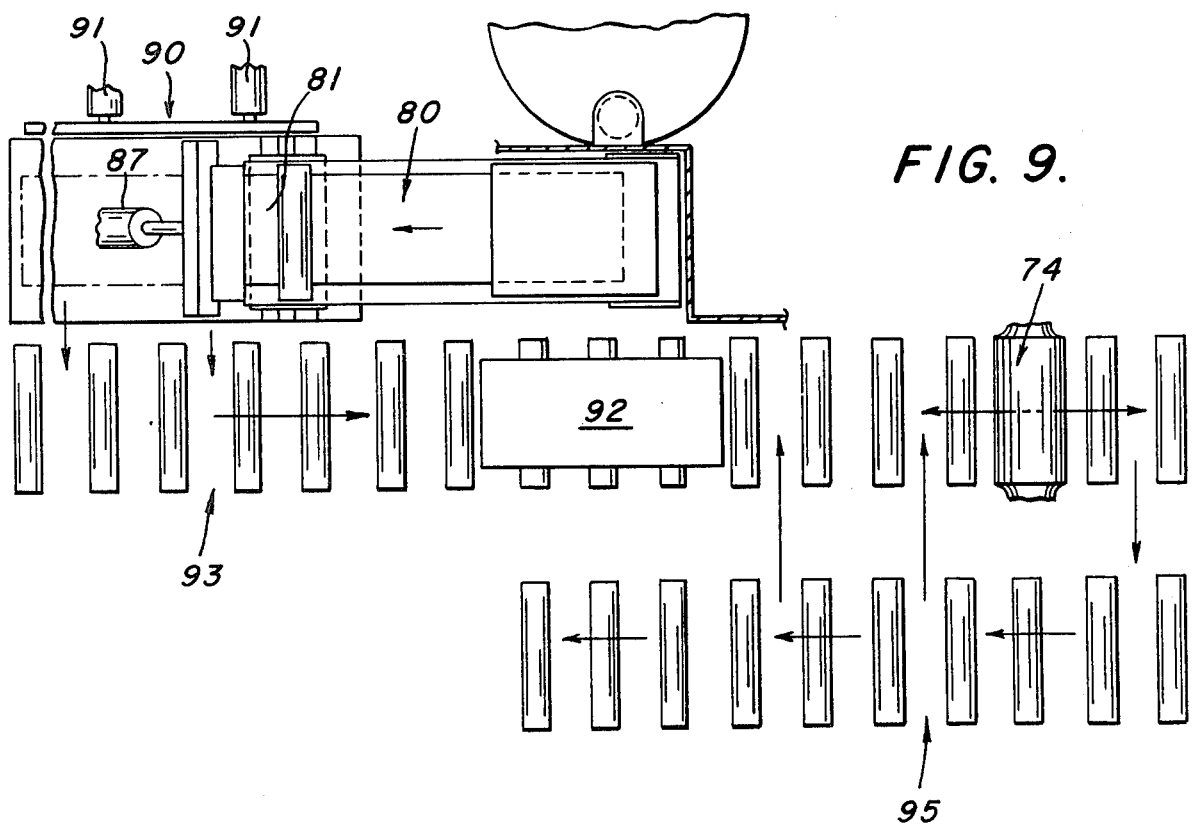
Figure 12:
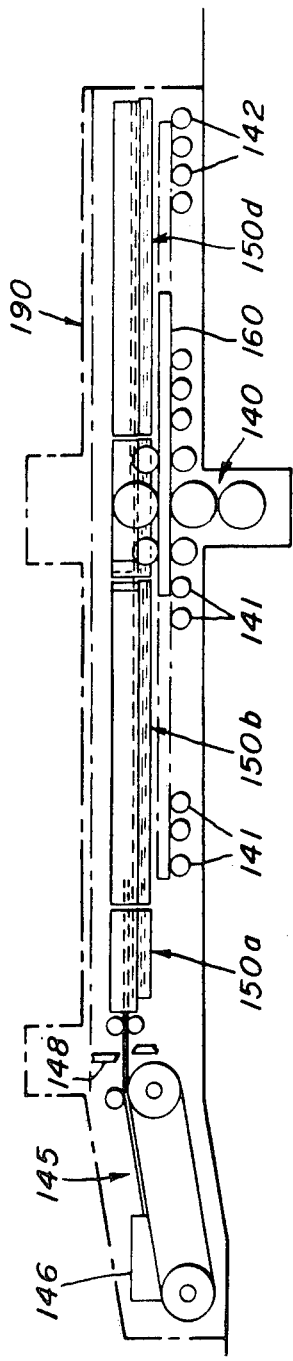
Figure 13:
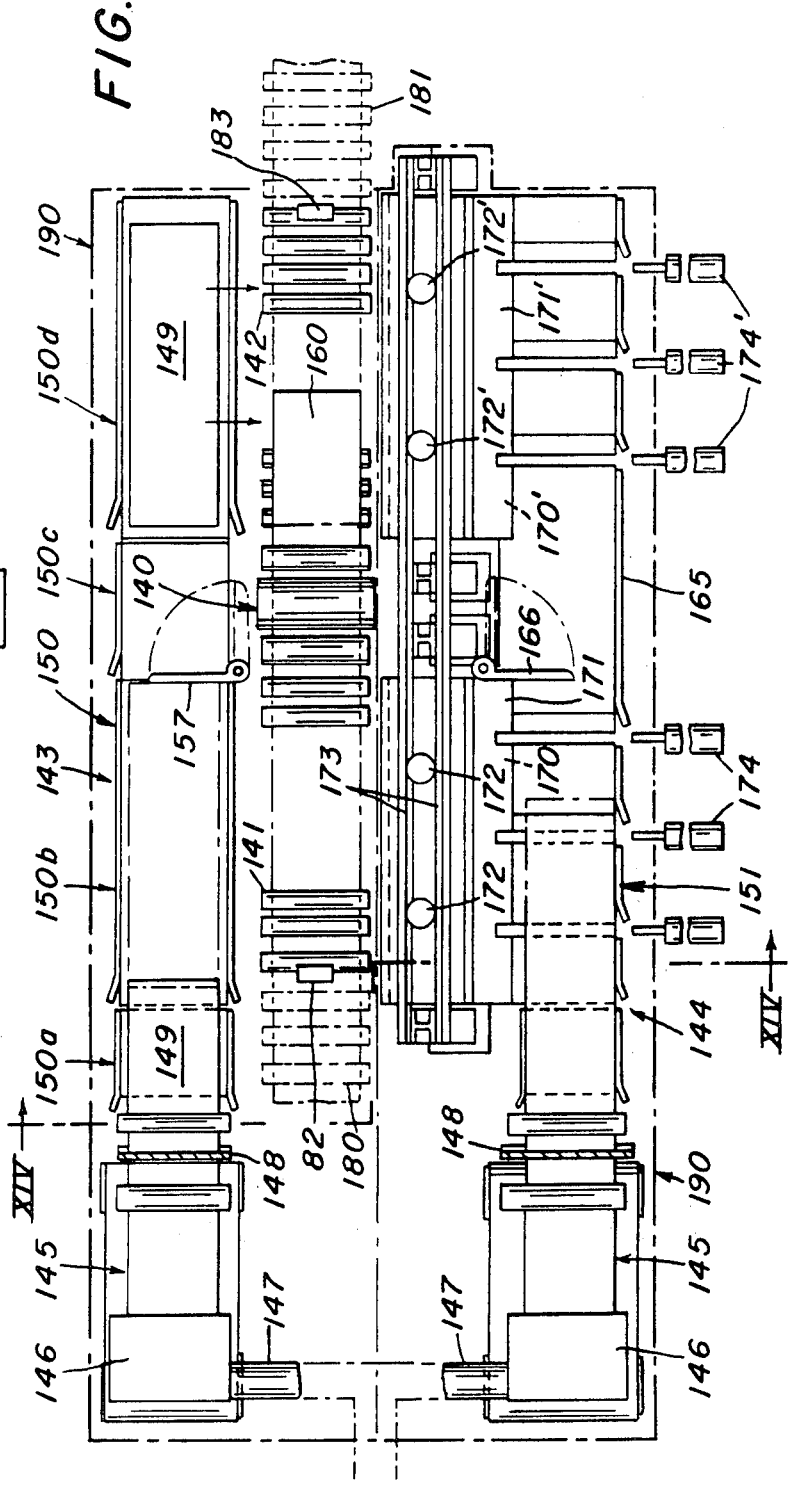
Figure 14:
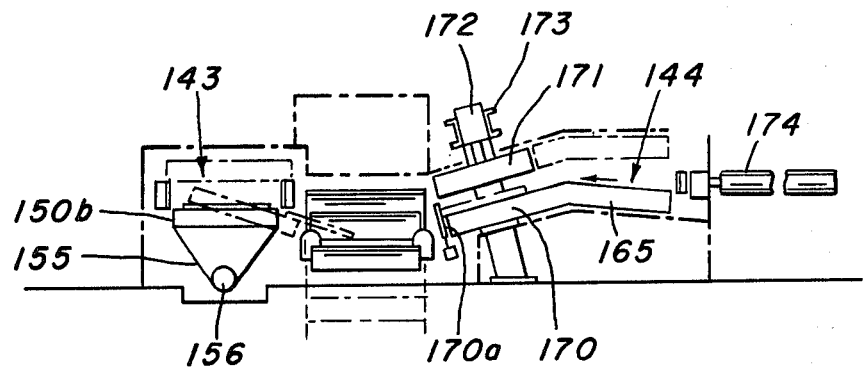
Figure 15:
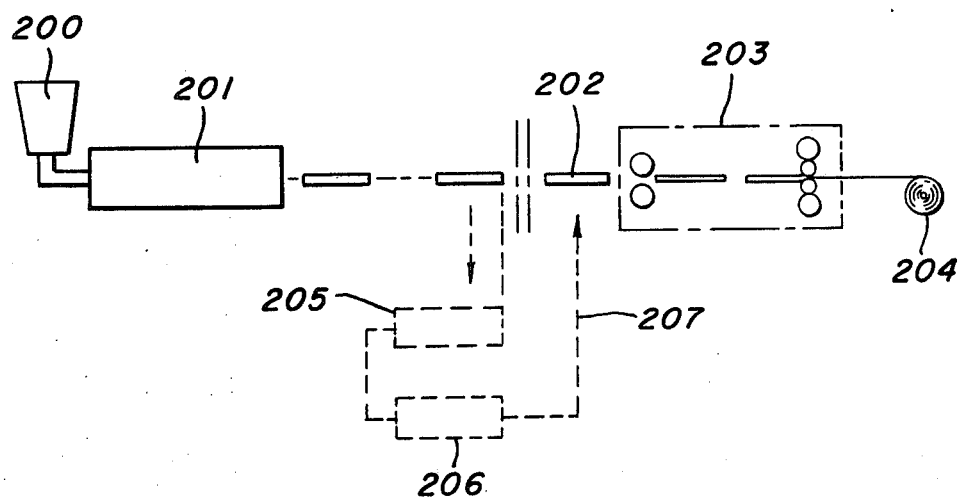
Figure 17:
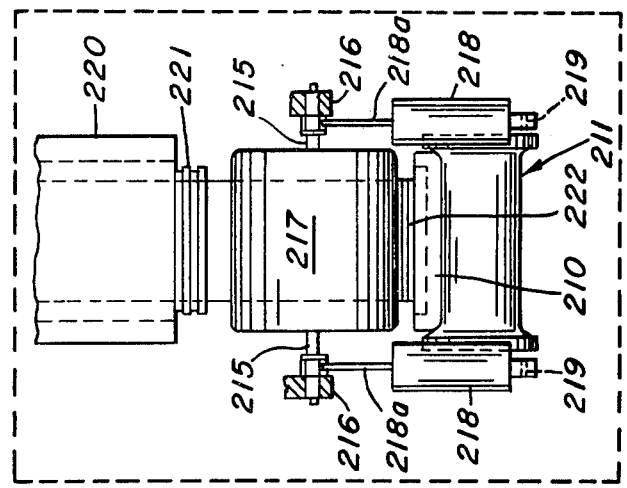
Figure 16:
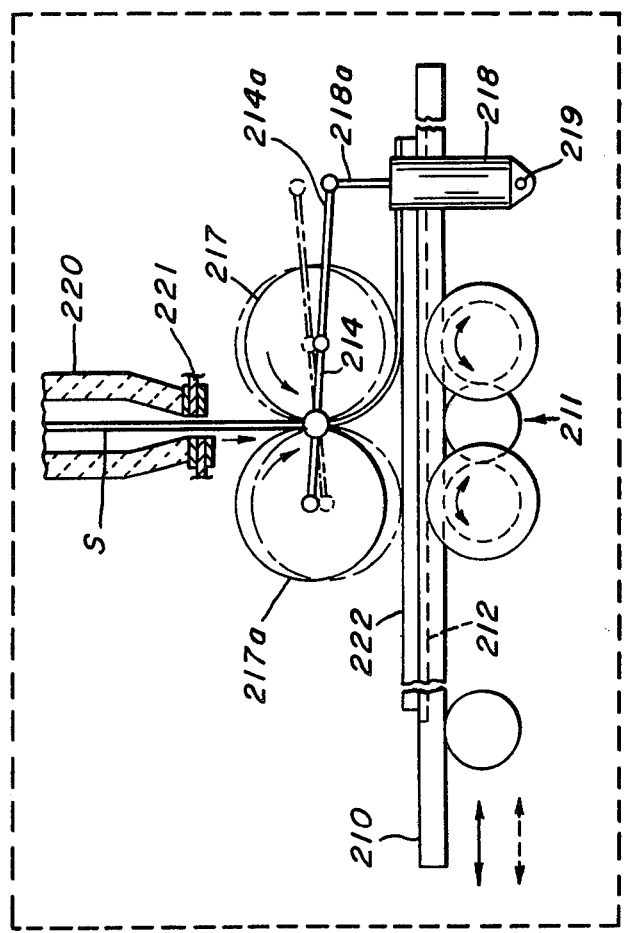
Figure 18:
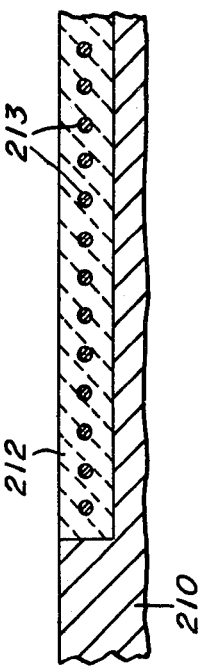

FIG. 4 is a modification illustrating schematically a side view of an apparatus and method wherein the wide thin strand is slit lengthwise into a plurality of strips, which are of selected widths, which, as here shown, are progressively narrower from one edge of the cast strand toward the other edge, but which of course could be of the same width or there may be a different number and the several strips are then severed transversely to pieces and piled on top of one another to produce blooms or billets, for example, of preselected dimension;

FIG. 5 is a top plan view of FIG. 4;

FIG. 6 is a modification of the method shown in FIGS. 4 and 5 wherein the thin cast strand is continuously formed on a belt, slit longitudinally into a number of strips of equal width and bent over while in such manner that the parallel strips are superimposed one upon another and the stack then is pressed together and the resulting continuous casting so produced by the interfacial welding or fuse-welding of the superimposed strips is then severed in pieces of predetermined selected length;

FIG. 7 shows a method similar to FIG. 6 wherein there is a separate casting and slitting unit indicated in broken lines alongside the first to be used where a thicker casting is required, the unit at the left providing the first several strips onto which the strips produced by the unit at the right are immediately stacked, or alternately the strips from the unit at the right could be interleaved between the strips from the unit at the left. This figure also discloses severing the individual strips prior to assembly into a stack before, instead of after, they have been assembled;

FIG. 8 is a side view and FIG. 9 is a top plan view of an apparatus in which successive pieces cut from a continuous strand are delivered vertically onto a space between opposed pressure plates, one of which is inclined from a vertical plane to provide proper support for each successive piece as it is severed at the lead end of the continuously cast strand;

FIG. 10 is a schematic illustration of an apparatus wherein successive pieces cut from a continuous strand are delivered alternately onto a reciprocating support into the roll pass of a reversing pressure roll and the direction of travel of the sheet piece is therefore the same as the direction of travel of the reciprocating support, or stack of previously deposited pieces already on the support;

FIG. 11 is in general a modification of the method and apparatus disclosed in FIG. 10;

FIG. 12 is a schematic view representing a longitudinal vertical section through another embodiment especially designed for the production of flat slabs;

FIG. 13 is a top plan view of the apparatus shown in FIG. 12;

FIG. 14 is a staggered transverse vertical section in about the plane of line XIV—XIV of FIG. 13;

FIG. 15 is a schematic diagram illustrating the conversion of the molten metal by this process to the finished product;

FIG. 16 shows schematically a modification illustrating the layering of the strand, end-over-end, to form a slab from a continuously cast length of chill cast metal which is a multiple of the length of the finished slab;

FIG. 17 is a top plan view of FIG. 16;

FIG. 18 is a fragmentary lingitudinal section on a larger scale showing the electrically heated inlay of thermal insulation in the top of the reversely traveling table on which the slab is formed;

FIG. 19 is a schematic view, partly in longitudinal vertical section but mainly in side elevation, of a casting unit where successive pieces of metal of the required length are intermittently produced, eliminating cutting of the metal;

FIG. 20 is a top plan view of the apparatus shown in FIG. 19.

Figure 1:
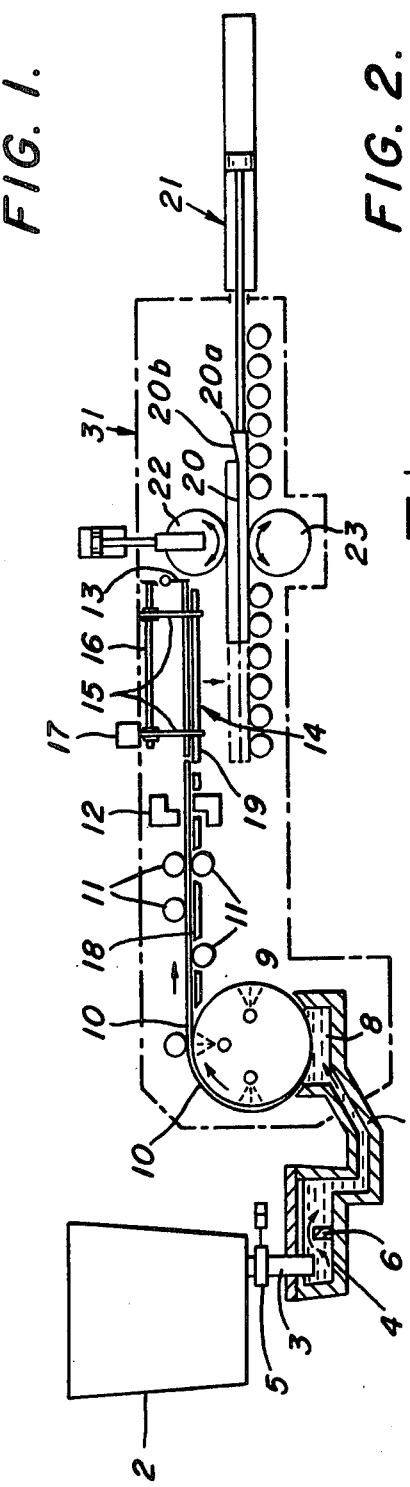
FIG. 1 shows schematically a longitudinal section through a casting plant embodying the apparatus and for the practice of the method of this invention.
Figure 2:
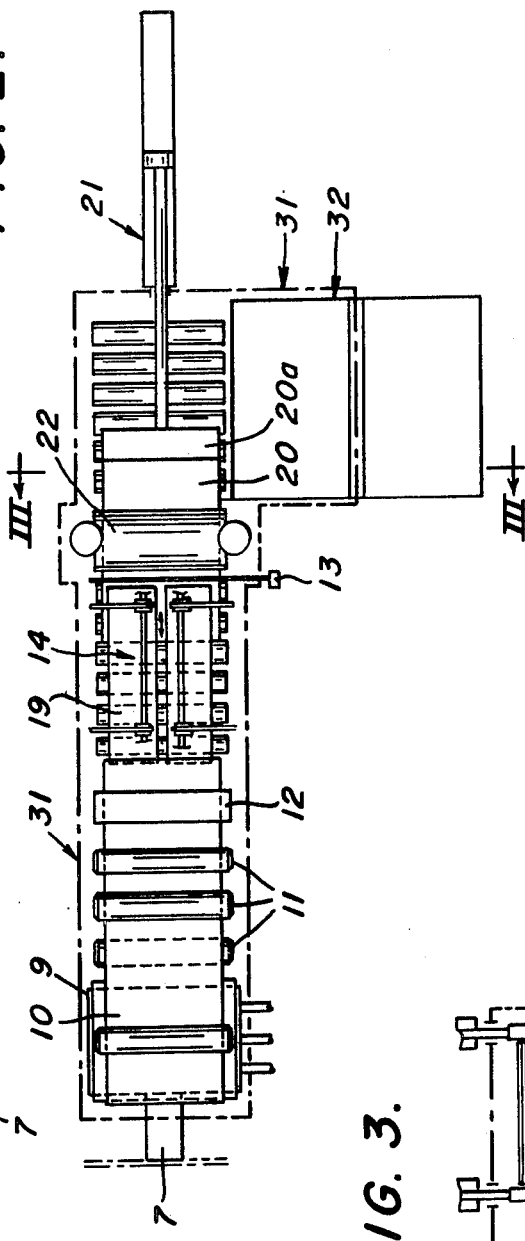
FIG. 2 is a top plan view of FIG. 1.
Figure 3:
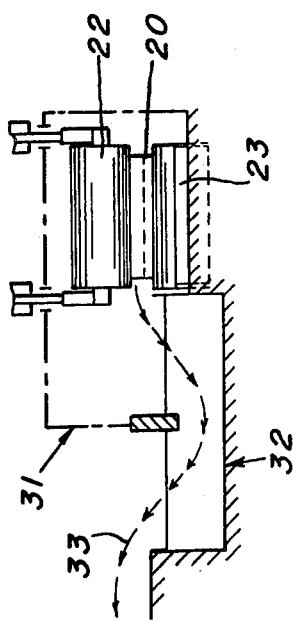
FIG. 3 represents a transverse vertical section in the plane of line III—III of FIG. 2.

In FIGS. 1, 2, and 3, showing schematically one simple apparatus and method for the practice of the invention, 2 designates a casting ladle with a discharge tube 3 that extends into an intermediate container 4 in which molten metal is normally maintained at a depth to immerse the discharge end of the tube. A flow control valve is indicated in the tube 3 at 5. For assuring that a depth of molten metal in the container 4 will, under normal operating conditions, immerse the lower end of the tube 3, the container 4 has an internal weir 6 over which the molten metal flows, and more importantly to assure floatation and removal of slag from the metal. From the outflow side of the weir, the metal flows through a connecting passage 7 of generally U-shape into a vessel 8.

By means of a continuously moving endless cooling wall, here represented by the surface of an internally cooled drum 9 dipping into the vessel 8 and operating at a uniform speed, a thin continuous layer of solidifying metal is deposited on the drum and withdrawn by the drum from the vessel. This layer, designated 10, is stripped from the upper surface of the drum at or close to the temperature where it is substantially entirely solidified and moved horizontally between leveling rolls 11. After emerging from the leveling rolls, it is sheared by a flying shear 12 into pieces of uniform length. A limit switch, which term includes an electric eye circuit of a known construction, is indicated at 13 to effect operation of the shear. At the time of shearing, each piece will have moved over parallel supports 14, one of which is suspended at each side of the machine by links 15 hung from respective rock-shafts 16. Various mechanisms of known construction, schematically indicated at 17, operate these shafts in unison to move the plates apart to drop each still intensely hot successive length onto a movable receiving bed hereinafter described.

The very thin hot layer as removed from the drum is extremely weak and flexible and must be supported in some way both before and after shearing to avoid damage. Usual supporting and transferring means would require cooling to avoid destruction or the sticking of the cast metal layer, or lengths, thereto. This would result in the undesirable removal of heat that would later need to be replenished, adding to the cost of equipping and operating the machine. The present invention contemplates that the supporting, guiding and even transport of the layers may be accomplished by generating alternating electromagnetic field which would provide a repelling force to levitate the layer or pieces or strips, and which might additionally supply heat to the moving metal.

To this end there are supporting plates indicated at 18 and 19, the latter comprising part of the movable supporting means 14 within which are tubular water-cooled tubes charged with alternating electric current of a frequency and strength, which, according to well-established formula, will generate a field for the purpose both of repelling the layer or severed pieces clear of the plates and inductively generating heat in the layer or pieces. The force imparted to the metal from the drum 9 and leveling roll 11 will normally be sufficient to carry the leading end of the layer to the limit switch means 13 to effect operation of the shear, but, with long pieces, the coils may be energized to progressively urge the metal in the direction of the limit switch and thereby supplement the force supplied by the drum 9 and rolls 11. Means for the generation of such traveling magnetic fields are well known in the art.

As above explained, the layer or strand to be severed by the operation of the flying shear will already be supported over the supports 14 and their plates 19 so that the mechanism 17 can also be controlled by operation of the limit switch to move supports 14 apart to allow the severed pieces to drop between them. Various means to trigger the operation of the mechanism to open and close the supports 14 in relation to the operation of the shear constitute no part per se of the present invention and are well known in automatic furnace and other door-operating mechanisms.

Below the movable supports 14 there is a layering of stacking unit comprising a bed-plate 20 having a fluid pressure cylinder and piston means 21 of a length to move the bed-plate a full back and forward stroke which is at least as great or greater than twice the length of the pieces being sheared from the continuously cast layer. The operation of the piston is so timed that the bed-plate is positioned to receive each piece as it drops from the support to lie flat on the bed-plate or directly on top of the piece last dropped if one or more pieces have previously been dropped in starting or forming a stack.

Immediately after each piece is received on the top of the stack on the bed-plate then in progress, or being laid on the bed-plate in the initial stage of making a stack, the piston operates to move the bed-plate toward the right as viewed in FIG. 2 between a pair of rolls 22 and 23, the upper roll of the pair 22 being arranged to move or be moved upward as the height of its stack of pieces on the support increases but exert a predetermined light pressure on the top of the newly placed piece as the bed-plate reciprocates between the rolls.

Figure 3A:
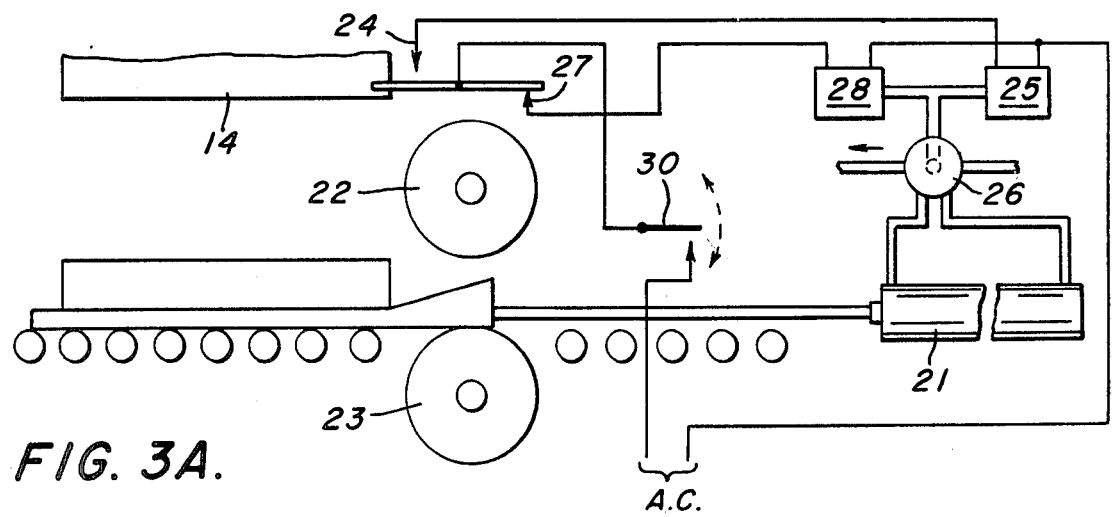
FIG. 3A is a schematic representation of a means for moving the base plate in timed relation to the placing of a length of metal on it or on a previously deposited length.

In FIG. 3A there is schematically illustrated one simple type of means for controlling the movement of the base plate in timed relation to the dropping of the lengths of hot metal onto it and merely indicates in a simple diagram one way of doing this. When one of the hinged supports 14 drops to a vertical position, it closes a switch 24 to energize solenoid 25, operating a four-way valve 26 to admit fluid pressure to the left end of the cylinder of the cylinder-piston unit 21 and release pressure in the opposite end of said cylinder to move the plate 20 from the left limit of its travel as shown in FIG. 3A. At the same time switch 24 is closed, switch 27 is opened, but, as soon as plate 14 swings out of engagement with switch 24, the switch means is biased to open switch 24 and close switch 27, whereupon solenoid 28 is energized to reverse the four-way valve and return the base plate through the rolls 22 and 23.

There is a floating type of switch indicated at 30 for opening the circuit to both solenoids when the base plate is at the retracted or right end of its travel when the stack of pieces or lengths reaches a predetermined height. This provides a pause in its operation to enable the finished product to be pushed sideways from the base plate for subsequent complete removal from the casting unit, as indicated by the arrows in FIG. 2 and as best shown in FIG. 3. A pusher such as, for example, a pusher mechanism hereinafter described may be used.

The right end of the base plate 20, as shown in FIG. 1, has an elevated end portion 20a that slopes at 20b to the flat level of the main area of the bed-plate. This elevated level is between the rolls 22 and 23 at the extended or left limit of the travel of the base plate as here illustrated so as to lower the upper roll onto the accumulating stack with each pass of the base plate toward the right or retracted position.

The broken lines, designated 31, indicate an enclosure beginning forwardly of the vessel 8 and extending past the rear of the roller table over which the base plate moves, the enclosure having side walls and a bottom wall so that a controlled, inert atmosphere, that is, a nonoxidizing atmosphere, may be maintained around the foregoing apparatus, and, to a considerable extent, heat loss is retarded. At the discharge end of the machine, that is the right end as shown in FIGS. 1 and 2, there is a liquid seal 32 indicated by a liquid-filled vessel into which the edge of the enclosure 31 dips and the product being shoved sideways from the base plate enters this pit and is removed, as indicated by the curved dotted arrow 33, the conveyor or other means for removing the product forming no part of this invention. The molten metal between the vessel 4 and the vessel 8 constitutes a trap to prevent air entering the enclosure at the point where the molten metal is introduced into the enclosure.

In the operation of this apparatus, a continuous layer of metal, typically about 3 mm. in thickness, is formed, cut into uniform lengths, and these are stacked in the manner described to form a slab or billet of the required thickness. Each piece, after the first one, is placed on the hot piece beneath it and because of its high temperature and clean surface, including the elimination or substantial elimination of air from the enclosure and, therefore, prevention of any appreciable oxidation of the metal, a fusion welding of the metal between the contacting surfaces occurs under application of appropriate pressure.

The appropriate pressure depends upon the physical properties of the layers. It must be sufficient to immediately establish intimate contact of the confronting surfaces. When a metal with poor plastic properties is produced, it may be more feasible to first apply the pressure after the metal has reached a temperature where it can stand a higher pressure without rupturing, in which case two or more base plates arranged for alternate operation may be used. In the case of other grades of metal, e.g., low carbon steel, which quickly reach good plasticity (hot working properties), relatively high pressure can be applied immediately since the material quickly becomes stiff. Absolute parameters for particular grades of carbon and alloy steels may have to be determined according to the size and shape of the product, the composition of the metal, the manner of applying pressure, as by rolls or by a press, oscillating plates or the like.

Taking as an example of this operation, it may be assumed that 150 mm. thick slabs with a length of 3 meters will be made by fusing together layers which are 3 mm. thick as they leave the solidifying apparatus, with the water-cooled drum 9 operating at a speed of 1 meter per second, at least 50 pieces cut from the continuously formed strip will be required to be stacked on the base plate 20. The piston and cylinder unit 21 should make a full back-and-forth stroke within 3 seconds. Thus, a slab would be completed every 150 seconds. However, a certain degree of height reduction, due to the pressure to which the hot metal is subjected, must be taken into consideration so that some additional pieces or layers will be needed for achieving the desired thickness of 150 mm. of the finished piece. However, since the reduction of thickness results in a corresponding extension of the length, the pieces or lengths can be cut slightly shorter. Thus, the stroke cycle of the piston may be somewhat shorter and the production rate per unit of time remains the same, that is, the finished weight per time unit is the same or approximately the same.

In FIGS. 4 and 5 there is schematically disclosed a method of and apparatus for simultaneously forming bodies of narrower width from a wide cast layer. As here shown, four billets or integrated bodies of progressively narrower width are formed from a single wide strand of metal emerging from a casting unit.

While a rotary drum as disclosed in FIGS. 1 to 3 could be used to form the thin continuously cast layer, FIGS. 4 and 5 disclose an arrangement where a continuously moving heat-resistant belt 35, the upper run of which travels in the direction of the arrow from a molten metal vessel 35a at an incline upwardly from said vessel around a roll 36 at the discharge end and the return reach of the belt then passes around roll 37 at the lower end of the belt. The vessel 35a is of upwardly decreasing depth and the upper reach of the belt, as here shown, moves along under the molten metal, forming a chill bottom wall for the pool of molten metal on the belt over which a thin layer of metal rapidly forms. This layer of metal has solidified when it reaches the upper end of the belt sufficient to be stripped therefrom and slit longitudinally by slitter 38 into parallel strips, here designated $S^1$, $S^2$, $S^3$ and $S^4$. While the strips might be the same width, or various combinations of widths, as here illustrated $S^1$ is the widest and they are progressively narrower, $S^4$ being the narrowest.

The parallel strips then are sheared by a flying or rotating shear 39 into pieces of uniform length.

Below the casting unit where the strips are formed and cut to length, there is a roller table 40 with plates 41 between spaced rollers 42. These plates retard radiant heat loss and may have resistance or induction heating means incorporated therein to heat the strips. About midway between the ends of the roller table there is a pair of pressure rolls 43 and 44, the upper one, 43, being vertically movable as in FIG. 1 to apply appropriate pressure to the stack of layers passing between them. There is a reversible drive indicated at 45 for driving one or both of these rolles. Guides are indicated at 46 for directing and confining the sheared lengths of metal into spaced parallel channels adjacent the bight of the rolls 43 and 44 and other guides 47 along the roll table maintain such parallelism.

In order to direct the pieces which leave the shear 39 in close side-by-side relation into spaced parallel paths, the casting unit is at an angle to the roll table and the emerging pieces of strips are looped downwardly from the shear to a guide roller means 48 about a radius of curvature which is progressively larger for the successive pieces from $S^1$ to $S^4$. By reason of this, each piece crosswise of the strips travels a longer loop, but in the same period of time, and undesirable distortion of the pieces is avoided.

In FIGS. 4 and 5, the parallel stacks being formed are indicated as B, and each stack extends from one side of the rolls 43 and 44. In operation, assume that stack B is traveling to the right as shown in FIGS. 4 and 5, there is a limit switch 50 at the right end of the roller table which will be engaged by the end of at least one billet (or other product being formed) to reverse the rolls 43-44 when the trailing ends of the billets have cleared these rolls and reverse the travel of the billet into the bight of the rolls which are now turning in the reverse direction. There is also a limit switch 50a at the left end of the roll table.

The loops between the shear 39 and the bight of the rolls must, for products of substantial length, be nearly as long as the finished products, and the rolls 43-44 must operate faster than the speed of the pieces emerging from the shear so that when one set of pieces are entirely deposited on the roller table or stack being formed on the roller table, they will reverse and their reverse travel will be completed and the left ends of the several side-by-side billets will be in a position to receive the leading ends of the next series of parallel severed pieces.

When the required number of layers have been applied to each stack and rolled, a fast-operating pusher comprising the bar 51 and piston and cylinder units 52 will be operated either manually or automatically by limit switch 50a to move the succesive bodies into a seal 53, such as described at 32 in conjunction with FIG. 3, the seal being part of a complete enclosure 54 surrounding the remainder of the casting unit. As in FIGS. 1 and 2, a trap will usually be provided in the molten metal inlet, indicated at 55.

There will be provided looping guides for directing the several pieces $S^1$-$S^4$ into their proper positions between the pressure rolls 43-44, but for clarity of illustration they have not been shown and form no part, per se, of the invention. Since such guides will remove heat from the length or pieces of metal passing therethrough, electromagnets energized from an alternating current source and, as illustrated in FIG. 1, will be associated with the guides to provide heat to the metal pieces and relieve, to some extent, the contact pressure of the metal pieces with the guides.

In FIG. 6 there is a casting unit of the endless belt type, as shown in FIGS. 4 and 5, with an upwardly inclined endless belt 60 as described in those figures and means 61 for holding a body of molten metal at a uniform depth from a supply inlet (not shown) but similar to that shown in FIG. 5 and also FIG. 7, to be hereinafter described. The molten metal is contained above the top run of the endless belt 60, which forms a bottom for the pool of metal retained by 61 and also provides a constantly moving chill surface, as previously explained, on which a thin layer of molten metal is continuously congealed. This continuously formed layer is stripped from the top run of the belt at its upper end and passed between slitting roll means 62 that divides the continuously formed layer longitudinally into a plurality of continuous parallel strips $S^9$ of equal width, which then pass between guiding rolls 63. As in FIG. 5, the casting unit is angularly disposed with reference to the longitudinal axis of the hereinafter-described means to which the strips are delivered.

The means for receiving the strips comprises first a pair of pressure rolls 64 with a guide means 65 in advance of the bight of these rolls of a width to receive, with only a working clearance, the strips $S^9$, but of a depth to permit all of the strips, one upon the other, to enter the pass between rolls 64. At the emerging side of these rolls there is a guide 66 similar to 65 but reversed thereto. Other guides are provided, as indicated at 67, and elsewhere if needed. There is a second pair of upper and lower rolls 68 which are flanged to provide a pass between them, and between 67 and 68 is another pair of grooved rolls 69 which rotate about vertical axes. They bear against the sides of the fused bundle of strips emerging from between rolls 64.

The stacking of the several strips $S^9$ is effected as in FIGS. 5 and 6 by having the parallel strips emerging from the rolls 63, each traveling through successively larger loops from the right side, for example of rolls 63 toward the left end while effecting a 180° twist in such manner that the strip $S^9$ at the left side of the series, as here illustrated, becomes the lowermost strip to enter the pass between pressure rolls 64, and each strip thereafter from left to right is guided in succession onto the strip beneath, forming a stack or bundle of strips, all at a temperature where they are pressed and fuse-welded or pressure-welded as before described, and at a temperature as explained where welding under relatively light or appropriate pressure (as hereinbefore defined) will take place. By looping the parallel strips in the manner described, the strips are easily brought to a position where they will come together without destructively twisting or bending the metal.

The product of the process and apparatus as shown in FIG. 6 may be cut into billets of uniform length, or of varying length by a flying shear indicated at 70. The hot continuously formed product could then be delivered, for example, to a rod or bar mill and reduced to a rod or bar of indefinite length or into bars which subsequently would be cut to length.

FIG. 7 which is a modified top view of FIG. 6 wherein the corresponding parts are designated by corresponding reference characters. All strips, $S^9$, are of equal width and, in place of guiding rolls at 63, there is a rotary shear $63^A$ with staggered cutters for progressively severing each of the emerging strips $S^9$ into pieces of uniform length so that while the loops may be progressively larger in diameter from one side of the unit toward the other, the lengths of all of the pieces will be equal, or approximately so, and they will stack or bundle one upon another with both the lead and trailing ends of all of the pieces approximately square with and vertically aligned with the corresponding ends of the other pieces.

Another difference between the structures shown in FIGS. 6 and 7 is that FIG. 7 illustrates in dotted lines a second casting, slitting, and cut-off unit 71 ahead of the first. With this arrangement, one bundle of strips may be assembled and integrated and then the other unit may operate to add additional pieces where the product to be produced is of a dimension, either in width or thickness, or both, too great to be produced from a single casting unit. Also, instead of using the two casting units in succession, both may operate at the same time and the pieces from one unit be interleaved with those of the other to form an integrated billet.

In FIG. 7 a flying shear 70 is also indicated, to be used as in FIG. 6, or, with the pieces sheared before stacking. The finished billets may be discharged sideways as shown in FIG. 3 but without reversing direction at a location following rolls 68 or discharged endwise from the enclosure. As in the other figures, an enclosure around the entire casting and product-forming unit is indicated by chain lines, this enclosure being designated 73 so that a nonoxidizing atmosphere may be maintained thereabout. The metal inlet to the casting unit, which, as previously explained, also constitutes a trap or seal, is designated 74. The apparatus of FIGS. 6 and 7 may be so interchanged that either may operate in the same way.

The arrangements shown schematically in FIGS. 8 and 9 are designated primarily for the production slabs where they need be only of a relatively short length. As in the other embodiments of my invention, the product is formed by progressively combining layers of metal, one on another, and pressure-welding each layer in turn to the next preceding one until a product of the required thickness has been produced.

In these FIGS. 8 and 9, the casting unit is shown as comprising an endless belt type as previously described, and it is designated generally as 80, without further description of the details. From the discharge end 81 of the endless belt, the continuously formed layer at a temperature above a temperature where it still has insufficient plasticity for normal hot rolling is deflected downwardly into the space between two confronting refractory blocks. The lower or left one of these blocks, as here shown, designated 83, is secured to a metal supporting structure 82. The upper or right one of these blocks 84 is carried on a metal supporting structure 85. The refractory plate and its support 82-83 is hinged at 86 to swing in a vertical arc from one upright position where it is steeply inclined from a vertical plane to a horizontal position, a fluid pressure cylinder and piston unit 87 being provided to effect this pivoting movement.

The opposite refractory plate and its support, 84-85, is supported to move toward and away from assembly 82-83. These two assemblies 82-83 and 84-85 comprise pressure plates or press platens with fluid pressure cylinder and piston elements 88 for moving the plate 84-85 toward and away from the other one.

The pressure plates in the position shown in FIG. 8 are located so that the descending layer of metal from the end of the casting machine enters the space between the two plates with the inclination of the plate 83 being such that some support is provided for the layer of hot metal as it moves down to prevent it from buckling or collapsing. When the leading end of the layer of metal has about reached the supporting ledge 86 at the lower end of plate 82-83, a flying shear 89 will sever the descending layer of metal.

Assuming that there are already one or more sheared lengths of metal between the two pressure plates, the pressure plate 84-85 will be operated to press each added length of metal against the face of the preceding one. The refractory plates 82 and 84 are heated to retard the loss of heat from the metal piece so that pressure-welding of the successive pieces is rapidly and effectively initiated. When the slab or billet has reached the required thickness to yield the ultimate desired product, the lower pressure plate 82-83 is swung down to the horizontal position indicated by dotted lines. When this position has been reached, a pusher 90 (see FIG. 9) is operated by fluid pressure means indicated at 91 to slide the freshly formed product 92 onto a roller table 93. It is transported by the roller table to a reversing roll stand 94, here indicated as a three-high stand so arranged that the slab may be alternately passed through the upper pass in one direction and the lower pass in the other direction. The roll stand is sometimes referred to as a "jumping mill." This rolls the hot product to assure complete unity of the several layers and compact it to the required thickness for subsequent processing into a finished product. Although not shown, the product could pass directly from mill 94 to an adjacent rolling mill to be further rolled, perhaps to finished dimensions without reheating.

Also, since the slabs may be too hot to have attained the desired plasticity for processing in the rolling mill 94, the roller table 93 may be of a length to support several of the freshly formed slabs at each side of the roll stand until they have cooled to a suitable temperature. Also, there is a third roller table 95 alongside of table 93 so that after passage of the product 92 through the mill, it may be moved sideways from table 93 to table 95 for further rolling, or carried to the discharge end (not shown) of table 95, the several arrows in FIG. 9 indicating these options. An enclosure, as in the other figures, would desirably surround the mill of FIGS. 8 and 9 so that the casting, forming and rolling operations may be performed in a non-oxidizing atmosphere, but, for purposes of clarity, this enclosure has not been shown in these figures.

FIG. 10 illustrates schematically an arrangement in which a continuous layer 100 of metal cast on a moving chill surface, as previously described but not shown in this figure, is cut by a flying shear 101 into pieces of uniform length. These pieces are delivered to a supporting and conveying table 102. The table 102 is pivoted at 103 near the shear for oscillation in a vertical arc, as indicated in the drawing. The oscillation of the table 102 is effected by an operating mechanism, here indicated as a fluid pressure cylinder 104 with a piston rod 105. There is a pair of pressure rolls, comprising an upper roll 106 and a lower roll 107. Reversible driving means for these rolls may be of a known construction, and such means is not shown in the drawings.

There is a roller table 108 extending to each side of this pair of rolls on which is a bed plate 109 that is shuttled back and forth through the pass between the two pressure rolls, and the reversing travel of the bed plate over the roll table from end to end is initiated by a fluid pressure cylinder and piston unit 110 at the left end of the roll table, and a similar unit 111 at the right.

The roller table is supported for controlled vertical movement which will enable it to lower as the weight on the bed-plate increases. This is indicated schematically by dashpots or like fluid pressure-controlled elements 112, at various positions along the roller table frame. At a level which is normally fixed with respect to the upper roll 106 during the operation of the mill, there is an entrance guide 113 on the left side of said roll and on the opposite side there is an oppositely facing entrance guide 114.

Finally, at the free end of the pivoted table 102 there is a supporting plate section or table 115 spaced above the roll 106, and which, in effect, forms a continuation of table 102 when the free end of said table is in its uppermost position. Beyond section 115 there is another table section 116 of a length somewhat greater than the length of the pieces into which the continuously cast layers of metal are cut. Section 116 is pivoted at 117 between its ends to rock in a vertical arc so as to tilt from the position shown in full lines in FIG. 10 to the position shown in dotted lines. In the latter position it forms an extension of table 115, but when tilted to the full-line position, its left end, as here shown, is flush with the inclined top surface of roll pass entrance guide 114. There is a cylinder and piston unit 118 for rocking table 114 up and down.

When the table 102 is rocked about pivot 103 to the lower limit of its movement, its free end then forms, in effect, a continuation of the left roll pass guide 113.

In operation, a length or piece of the continuous casting, upon leaving the shear, moves down conveying table 102. With the table 102 in its upper position, as shown in FIG. 10, the cut piece will move over section 115, at which time section 116 would be in the dotted-line position to receive it. When the piece is on the tilting section 116, that table will tilt to the full-line position, and its lead end will pass from the right under the upper pressure roll 106 onto the bed-plate, which is then also just entering the roll pass from the right, and the piece will move through the roll pass being thereby pressure-welded to the last piece previously placed on the roll table. Lower roll 107 will exert pressure against the bed-plate 108 which holds the cast layer up against upper roll 106 at the appropriate pressure. The machine will be so timed by any one of several well-known types of control systems so that the lead end of the bed-plate, then moving to the left, will enter the roll pass to meet and support the lead end of the cut piece. In FIG. 10, a partially formed billet or slab is shown on the bed-plate.

When the bed-plate has reached the limit of its travel toward the left and has cleared or about cleared the pass between the pressure rolls 106 and 107, cylinder 110 will operate to start it back through the roll pass in the opposite direction. By this time the table 102 will have been lowered to direct the next piece sheared from the casting over the left guide 113 to enter the roll pass and deposit the leading end of that piece on the then leading or right end of the bed-plate or the last previously deposited piece on the bed-plate. This cycle of operation is repeated until the required number of pieces have been integrated into a homogenous mass. Then the now-finished slab or billet will be pushed or otherwise removed from the bed-plate, as, for example, by pushing means (not shown), but in the same manner as previously described in other figures. Sequencing relays and other well-known circuitry may control the operation although manual operation can be provided for. An enclosure 120, as in previous figures, is indicated in broken lines to keep a nonoxidizing atmosphere around the operation to prevent scaling of the metal and assure a clean surface-to-surface contact of the successive pieces. The lower pressure roll 107 is yieldably supported by a cylinder and piston means 107' to apply the required appropriate pressure upward toward roll 106 but to lower as the thickness of the product builds up on the bed-plate. Similarly, the roll table 108 can lower as the lower roll 107 lowers.

In FIG. 11 the construction is for the most part the same as in FIG. 10, and the same reference numerals are used to designate corresponding parts in the two figures. The significant difference is the more simple switching arrangement for alternating the direction of travel of the successive pieces. In this view there is a guide 125 at the left side of the upper pressure roll 106 with an upwardly and rearwardly turned extension 126. A generally similar guide 127 at the right of this pressure roll 106 has an upwardly curved extension 128 that passes above the upper roll 106 and extends above the guide extension 126, but which is spaced above it. In the space between the extensions 126 and 128 there is a fixed guide 129 having diverging branches 130 and 131 providing two passages, one of which, 133, extending in spaced relation to guide extension 126, provides a passage for directing the leading end of a severed piece of a cast layer under the upper pressure roll from the left and onto the bed-plate which is then moving toward the right. The upper branch 131 together with guide extension 128 provide a passage arranged to direct pieces over the top of the upper roll and then downwardly under the upper pressure roller from the right toward the left and against the bed-plate which is then moving toward the left. In this case the piece is turned over in relation to its original top and bottom surfaces. The tilting conveying table 102 in this case moves between the full-line position shown in FIG. 11 where it confronts and is flush with the end of guide extension 126 and the end of fixed guide 129, as indicated in dotted lines, and back down to the full-line position to alternately feed the strips under the upper pressure roll from the left toward the right and then from the right toward the left in isochronism with the travel of the bed-plate, first from the left toward the right and then from the right toward the left. The movement of the bed-plate may, for example, be timed by the operation of the flying shear 101, as can also the raising and lowering of the conveying table, controls suitable for this purpose being well known.

In order to supply heat to the sheared pieces as they are alternately guided to one side of the upper pressure roll and then the other in the arrangement shown in either FIG. 10 or 11, the spaced dots in the drawings indicate conductors in section designed to be energized from a source of alternating current (not shown) enclosed or contained in the conveying table 102 and the several conveyor sections and guides to thereby reduce the contact between the successive pieces and the tables and guides by generating repulsion forces and perhaps also aid in effecting their travel, and, as previously described, inductively heat the pieces to maintain them at a temperature where they can be pressure welded.

FIGS. 12, 13 and 14 disclose schematically a mill for producing slabs or plates at a high rate of production. To this end, there is a reversing pressure roll stand 140, here illustrated as a 3-high stand of the type sometimes referred to as a "jump roll." In such a roll stand the pass in one direction is between the top and middle roll, as shown in the drawing, but between the middle and bottom roll in the opposition direction with means for moving the rolls vertically to maintain the roll pass in both directions at the same level.

There is a roller table 141 at the left of the pressure roll stand at a level to receive slab lengths of metal and support the material being rolled, and a similar roller table 142 at the right of the pressure roll stand. There are two lines for producing slab length castings, one, designated generally at 143, being along one side of and parallel with the roll tables 141 and 142, and the other line, also parallel with the roll tables but on the opposite side of said roll tables, is designated generally as 144. There is a continuous casting unit 145 at one end of each of said lines 143 and 144. They are here shown at the left end of the respective lines. They are illustrated as being of the belt type units previously described. Each has a molten metal retaining vessel 146 with a molten metal supply inlet 147. At the discharge end of the continuous belt there is a flying shear 148 that cuts the respective continuous thin flat casting produced by the respective casting units after they have been stripped from the belt into slab length pieces 149, as best seen at the left end of line 143 in FIG. 13. These pieces, as they are sheared, pass over a sectional receiving table 150 for line 143 and table 151 for line 144.

Sectional table 150 in line 143 is elevated above the level of the roller table 141 and is comprised of two fixed sections 150a and 150c and two transversely tiltable sections 150b and 150d. As best seen in FIG. 14, the tiltable sections are on supports 155 arranged to rock or tilt sideways about a longitudinal axis 156 from the full-line horizontal position in FIG. 14 to the tilted position shown in dotted lines. There is a movable stop 157 between sections 150b and 150c which, in the position shown, will block the movement of a severed length 149 to retain it on the tilt section 150b, but which, if moved out of blocking position, as shown in dotted lines, enables a severed length to pass along onto the second tilting section 150d. By tilting one of the table sections 150b or 150d, a piece supported thereon can be caused to gravitate onto the then adjacent bed-plate 160 which is movable between the pressure rolls of stand 140 onto one or the other of the roll tables 141 or 142 to be then rolled by the pressure rolls.

All of the sections of table 150 are provided with multiphase alternating current windings designated in FIG. 12 by the spaced, staggered, parallel lines to move the pieces 149 to the stop 157 if the piece is to be discharged onto a bed-plate 160 which is at that time entirely supported on table 141 to the left of roll stand 140. If, however, the stop 157 is withdrawn from its operating position, the piece may travel to the end of the runway, that is, to a position where it is centered on the tilttable section 150d to be discharged sideways onto the bed-plate 160 which will then be to the right of the pressure roll stand 140 and then supported on roll table 142. The alternating current windings may, as previously explained, also inductively heat the successive pieces of metal as they are moved along over the table sections.

With the arrangement of tilting section 150b and 150d, selected lengths of thin cast flat metal can, for example, be alternately placed on the bed-plate 160 as it travels back and forth, first when the bed-plate is to the left of the pressure roll stand, and then to the right, and as each piece is placed on the one preceding, it is pressure-welded and integrated with the underlying piece.

The line 144 along the other side of the mill is arranged to operate somewhat differently from line 143, although it has a supporting table 165 for receiving the sheared pieces from its casting unit. Table 165, like table 150, is also at a level above the pressure roll tables 141 and 142, but it is spaced laterally from these tables a substantially greater distance than the sections of table 150 on the other side of the mill. The successive pieces are moved along the table from the casting unit by polyphase magnetic means (not shown) but arranged similarly to the means in the table sections of 150 as above described. There is a stop 166 over table 165 similar to stop 149 on the other line. If the stop 166 is in the blocking position shown in full lines in FIG. 13, a cast piece will be stopped on the table 165 to the left of the pressure roll stand 140, but, if the stop is moved out of position to block the cast pieces or layers, they will travel along the table to stop at the other side of the pressure roll stand 140.

As best seen in FIG. 14, there is a transversely sloping lower platen 170 alongside the table 165 and to the adjacent side of roll table section 141. Above this platen there is a vertically movable platen 171 which is moved up and down by power cylinder units 172 on fixed parallel supporting rails 173, the upper platen being movable in a plane where its lower face is parallel with the top surface of the transversely sloped lower platen. Alongside this portion of the table 165 there are pushers 174 which operate simultaneously to push a sheared section transversely from the surface of the table 165 to the left of the stop 166 onto the platen 170. A second length or piece may then be pushed onto the first piece and the upper platen lowered to fuse or pressure weld the second piece over the first and this cycle may be repeated until an integrated slab of the desired thickness has been built up on the platen 171.

At the right end of the table 165 there is a similar press arrangement with a lower platen 170' with a vertically movable transversely inclined upper platen 171' powered by cylinders 172', also supported on the spaced rails 173. There are pusher means 174' which operate simultaneously to move successive pieces or lengths of metal that are delivered to the right end of table 165 to the left from the table 165 to platen 170' to form an integrated stack of pieces.

Both platens 170 and 170' and 171 and 171', respectively, of each of the two presses have electric heating means encased therein or otherwise arranged to assure that fusion of the successive layer into a unitary body, although they may not be as thoroughly fused as desired. There is a downwardly movable side plate 170a along the lower edge of the lower platen 170'. By selectively moving one or the other of these side plates down, the fused stack of plates thereon may slide onto roller table 141 or 142, as the case may be, and passed between the pressure rolls 140 one or more times to more completely effect the fusion welding of the several sheets or layers in the stacks so processed, the body of the slabs at this time being of sufficient mass to retain enough heat to enable such consolidation to be effectively performed. When this operation just described is being done, the bed-plate, which is not now required, may be run out of the way onto a roller table 180 indicated in dotted lines at the end of roller table 141 and the product may be run off onto a conveyor table 181, also indicated in dotted lines in FIG. 13. At this time, end stop 182 at the left end of roll table 141 is lowered and end stop 183 at the right end of roller table 142 is lowered to enable the finished slab to be removed.

An enclosure 190, indicated by broken lines, surrounds the mill so that a controlled nonoxidizing atmosphere may be maintained around the mill during its operation. A seal is provided, such, for example, as that shown in FIG. 3 but at the end of roll table 142 though which the slabs are discharged endwise. However, some other sealed outlet for the discharge of the slabs to the atmosphere may be provided, as for example a "decompression" type of multiple doors used in other industries.

FIG. 15 is a block diagram illustrating the entire process from the conversion of the molten metal to an intermediate product and then to a finished product. In this diagram, 200 designates a ladle which receives molten metal and 201 designates both the casting unit and the mill for consolidating the pieces into a product, such as the mills herein previously described in FIGS. 1 to 14 or the like. The intermediate product, either billets or slabs 202, may pass directly to a rolling or finishing mill 203 and converted to a finished product, indicated by the coil 204. Some or all of the intermediate product may be diverted in advance of unit 203, as indicated in dotted lines, to be stored at 205. They may then be subsequently charged into a reheating furnace 206 and entered, as indicated by the dotted line 207, into the same or other finishing unit 203.

As thus illustrated, the molten metal is continuously converted into a layer or strip, then into a billet or slab or like body as an intermediate product of greater thickness than the original cast layers than the final product into which the metal is to be converted, and this intermediate body is thereafter rolled or forged into the finished product.

In all of the foregoing embodiments, a single casting unit produces a multiple of lengths or widths, or both, from a continuous strand that is then cut into lengths or strips or both and layered together to produce a unitary casting by layering one above another and pressure welding them. In the subsequent figures, a single casting unit is arranged to produce pieces which are the length of the product to be formed and which are layered to produce integrated bodies, or, alternatively produce a strand which is a multiple of the length of the product to be produced and which are layered by folding the casting on itself until a product of the required thickness results.

In FIGS. 16, 17 and 18, there is disclosed a method and apparatus wherein a continuously formed strand is delivered to a layering device wherein the strand is folded upon itself and the layers pressure welded. The strand is severed after a length, corresponding to a multiple of the product length and sufficient to produce a product of the desired thickness, has been formed and most of it has been supplied to the folding unit where it is then severed and the formation of a succeeding slab or billet then follows in the same manner.

In the figures, 210 is a reciprocable table having a reversing drive, schematically indicated at 211. The table has a recess in the top filled with a heat insulating material 212 of a length and width greater than the corresponding dimensions of the product to be formed, and, when desired, it may be provided with embedded electric resistance or inductive heating conductors (see FIG. 18) 213 connected with an energizing current source, not shown.

There is a tiltable frame 214 with trunnions 215 at opposite sides carried in fixed supports 216, shown fragmentarily in FIG. 17 only and about which the frame 214 may rock in a vertical arc. At equal distances from the axes of the trunnions there are pressure rollers 217 and 217a and the axes of the trunnions are desirably centered on the line of centers between the rollers 217 and 217a. An extension 214a of the frame at 214 at each side of the frame is pivotally connected to the upper ends of piston rods 218a with pistons, not shown, in fluid pressure cylinders 218, one such piston and cylinder being at each side of the frame, and each of which is pivoted at 219 to a supporting frame, not shown, in a manner well known in the art to accommodate for the arcuate movement of the extensions 214a as the piston rods move up and down.

The heated layer or strand S of metal, formed in various ways as hereinbefore described, is directed downwardly through a heat insulating and, if necessary, an electrically heated enclosure 220 into the bight between rolls 217 and 217a. There is a shear 221 at the exit end of the enclosure 220.

Assuming that the table is moving toward the right as indicated by the full line arrow in FIG. 16, the roll 217 is depressed to bear on the hot strand descending between the rolls 217 and 217a to be pressed onto the top of the partially formed product 222 and thereby pressure roll and weld it to the underlying layer of metal on the product being formed on the table. When table 210 reaches its right limit of travel, the pressure cylinders 218 will be operated to lift roll 217 and lower the left roll 217a and the carriage will reverse to fold the metal the other way and then be flattened down by roll 217a and pressure welded to the previously completed layer, the dotted arrow indicating this reverse travel of the table.

As the product reaches the desired final thickness, the shear 221 will be operated by a counter or thickness detecting switch means of any well known or preferred type so that the last layer will be complete and the product will comprise a single length of metal, layered and fused, the length of metal in the strand being a multiple of the number of individual layers of which the finished product is comprised.

No arrangement for removing the slab or casting when finished has been shown, but one table may be provided to be run into place to replace the one to be unloaded or the casting may be slid endwise from the table onto a receiving conveyor or carriage. As indicated by broken lines in FIGS. 16 and 17, the apparatus is preferably contained within an enclosure to which an inert, i.e. nonoxidizing, gas is supplied and from which air is removed to avoid oxidation of the metal.

FIGS. 19 and 20 show in schematic longitudinal vertical section and in a top plan view, respectively, a further modification wherein a moving chill surface is discontinuous to intermittently form separate sections or lengths instead of being continuous as in all of the hereinbefore described casting apparatus. As here shown, there is a casting roll designated generally as 230 on a shaft designated generally as 231 and which is driven in the direction of the arrow shown in FIG. 19 by driving means, not shown. The roll 230 has a chill surface 232 extending around the greater portion of its periphery. This chill surface surrounds and forms, in part, a water cooling space 233. There is a recess 234 formed across the face of the roll forming a gap in the chill surface of a relatively few degrees of arc around the periphery of the roll. In this recess there is an insert or segment 235 of low heat conductivity, being formed mainly of a refractory, and its surface is flush with the chill surface and concentric with the axis of rotation of the roll. It may have heater elements embedded therein, as indicated at 236, to assure of its being not enough to prevent the molten metal from solidifying thereon.

The shaft 231 for the roll comprises an inner tubular passage 231a connected with a supply of cooling water, not shown, and which is surrounded by a concentric tube 231b forming a cooling water discharge duct, as indicated by the arrow at 231c in FIG. 20. Radial passage means 231d provide for the flow of water from the central passage to the peripheral water cooling space 233 and passage means 231e provide an outlet from the opposite limit of said space arcuately from the inlet and discharging it to tube 231b.

There is a refractory shoe 237 located against, or very close to, the upper left quadrant of the roll 230 with a central passage 238 through ports 239 through which molten metal is supplied to the cavity or pocket 240 formed between the shoe and the periphery of the roll. This cavity or pocket opens upwardly in the direction of rotation of the roll which, as here shown, is clockwise and retains a pool of molten metal against that portion of the periphery of the roll which at any moment is submerged beneath the said pool. As the roll rotates, a thin layer of metal solidifies on the water-cooled surface and fresh metal as continuously supplied through passage 238 and ports 239 as metal in the pool is removed. When the refractory segment moves beneath the pool of molten metal, none of it solidifies against said surface. Below the surface of the roll 230 there may be a trough or pan 232a for holding a release compound into which surface 232 of the roll dips to enable the casting to be more easily stripped from the surface of the roll. A similar result may be achieved, of course, by operating the chill surface continuously but periodically cuttng off the supply of molten metal to the pool.

Above the roll there is a track structure comprising a center section 240 along which a supporting table or plate 241 moves from left to right first over the roll 230 generally tangent thereto. The solidifying layer of metal on roll 230 is stripped from the drum with the aid of stripper 242, and held against the undersurface of the plate magnetically or simply by the counterpressure exerted by a weighted or spring-biased counterpressure roller 243, and subsequently by the pairs of pressure rolls 244 and 245. After the initial pass of the plate over the roll 230, subsequent layers will be supplied, each against the preceding one until a slab of the required thickness has been produced.

The track structure has a run-out end section 246 to the right of the center section 240 onto which the plate 241 travels between pairs of rollers 245, then elevated to travel in the reverse direction between pairs of rollers 247 and further between rolls 247a, on track section 248 and lowered to repeat a pass over the top of the casting roll where a second and, in a similar cycle, succeeding layers are pressure fused to the previously applied layer until the slab has attained the required thickness.

Each cycle starts with the right end of plate 241 in line with a vertical line of centers extending from roll 230 to counter-pressure rollers 243. It will be noted that there is a heat insulating slab 241a therein, set back from the leading edge of the plate. Also, at the start of the cycle, the heated segment is immersed under the molten metal in the cavity 240.

As the rotation of the roll 230 starts, the plate 241 begins moving toward the right, and as the leading edge of the solidified layer on the water-cooled area of the roll 230 is lifted off roll 230, it is pressed between roll 230 and the leading end of the insert 241a. When the roll 230 has completed one complete revolution and the refractory segment is again in the "start" position, the plate 241, which is now supported on track section 246, will be raised by lifting the track section and placed passed over the casting roll but at an elevated level above it to the left onto elevated track section 248, which is then lowered and the plate moved toward the right to its "start" position.

This is but one way in which individual sections are formed and layered without any cutting of a continuous strip. Of course, the apparatus of FIGS. 16 to 18 could be used by feeding the successive individually cast pieces down the enclosure 220 of FIG. 16, but no shear would be required. With such an arrangement, a separately cast length could be layered on each pass of the table beneath rolls 217 and 217a or with each pass in one direction only. Various other apparatus, as herein disclosed, may be used for layering the successive lengths. Billets may be changed in length by increasing the heated segment of the casting roll and decreasing the length of the chill surface, substituting one roll for another.

Also, in the foregoing description, any apparatus or procedure illustrated in any of the figures may, where relevant, be used with or substituted for a part having a like function in any other figure, such as for example, a chilled roll as shown in FIGS. 1 and 2, may be substituted for an endless belt casting unit or vice versa and elements or means or steps shown in one modification may be used where applicable in other modifications.

In each of the several apparatus embodiments and methods herein shown and described, there is a single or primary casting unit, operating continuously or intermittently, capable of providing all of the pieces or layers required to produce a complete billet, whereas, in my earlier filed application, a minimum of two casting units, one for forming an under-layer and one for forming an over-layer, are required and for each additional layer another casting unit is necessary. This casting unit of this invention may form individual pieces directly or include means for continuously forming a casting with shearing means for dividing the casting as formed into separate pieces or layers. Also in the present application successively formed pieces are stacked at a temperature where the last layer will pressure weld to a previously formed layer so that a pass through a single pressure unit, which, however, may comprise successive steps, as in FIGS. 8 and 9, where pressure plates effect an initial fusion which may be improved by subsequently rolling the assembled slab. In my said copending application there are required to be separate roll stands for each added layer. The present invention also provides a production line in which one stacking unit or operation takes care of stacking all of the pieces from a single casting unit. This, however, does not exclude a method or apparatus as disclosed in FIG. 7, for example, where two casting units may supply layers to the same stacking and pressing rolls successively or by interleafing strands from two casting units where a thicker billet is to be formed than can be produced economically on a single casting unit, or where, as disclosed in FIGS. 12–14, a single pressure roll unit 140 accepts individual pieces to form successive layers of a billet cast in casting unit 145 and line 150 and which, at the same time, accepts stacked and initially welded pieces from line 151 and provides a second pressure rolling pass for finishing slabs assembled on stacking units 170 and 170'.

The term "casting unit," as herein used and unless otherwise stated, comprises either an arrangement wherein the casting roll delivers individually formed separate layers or pieces or where it delivers a single strand that is sheared to produce separate layers or pieces while the pieces are still hot enough, either as sheared or with added heat to be pressure welded to the confronting surface of a previously formed layer. The terms "stacking unit" or "layering unit" include apparatus where the cast pieces or layers are brought together in superimposed relation and face to face contact, and the term "pressure welding unit" for applying pressure, either by rolls or opposed press platens or the like, may, in many cases, be also a part of the stacking or layering operation. The term "pressure welding unit" may also define an arrangement as shown, for example, in FIG. 13 where an initial pressure is applied in press 170–171 or 170'–171' and final consolidation is effected in roll stand 140. Also it includes apparatus as disclosed in this figure where a slitting roll, as 62 in FIG. 7, would divide the strand lengthwise into two pieces, one of which would be moved over top of the other and initially pressed together in unit 170–172 to then be discharged onto bed-plate 160 to await the discharge of a second pair to be then passed through rolls 140. Alternately a pair of two may first be fused together in press 170–172 and then moved through rolls 140 to receive a second pair from press 170'–172' and then returned to the first position and thus alternated until a piece of the required thickness had been completed.

It may be further noted that the terms "billet" and "slab" as used herein to designate the composite body produced as herein described are not strictly limited to bodies intended to be converted to a finished product by reheating, but is intended primarily to indicate shape, as a billet primarily indicates a shape which is thicker and more nearly of square section while slab refers to a product the width of which is much greater than the thickness. Each term, however, is used in the sense of a semifinished product intended to be subsequently converted to a finished product by further working, hot or cold.

In addition, or in lieu of, the means herein illustrated for supplying heat to the pieces as they move between the casting unit and the pressure welding unit, torches, inductive heating means, etc. may be located at the bight where pressure rolls engage the layer or layers to supply heat locally to assure adequate pressure welding of the layers, but for clarity of illustration and the small scale of the drawings, have not been shown.

Typically, each cast layer in a billet or slab will be of the same thickness and this thickness will be in the range of perhaps 2 mm. to about 5 mm., but may be thinner or slightly thicker. The invention will doubtless find application principally in smaller shops and in specialty steel production, but this is not necessarily the case.

It is also well known to metallurgists that, in processes such as this where intercrystalline diffusion takes place, time and temperature are significant variables, so that in some cases it may be desirable to retain the pressure welded product at elevated temperature in the nonoxidizng atmosphere to take advantage of these factors before exposing the product to ambient temperature.

I claim:

1. The method of converting molten metal into semifinished products for subsequent conversion into finished products, wherein:
   (a) molten metal from a common heat substantially free of slag is congealed on a single casting unit with a moving chill surface on which the molten metal congeals and discharging the casting so formed from the unit as a plurality of non-laminated thin sections;
   (b) transporting the sections as formed to an assembly unit where they are assembled into bodies of predetermined thickness with one section in face-to-face relation with another and with each section at a temperature where it will pressure weld to the contacting surface of another; and
   (c) effecting pressure welding of the bodies so assembled and discharging them when the entire assembly has been integrated by welding.

2. The method defined in claim 1 wherein the sections are discharged as individual sections in succession from the casting unit and transported individually and in succession to the assembly unit.

3. The method defined in claim 1 in which heat is supplied to each section between its initial formation and its assembly into an assembled body.

4. The method defined in claim 1 in which heat loss from each section is retarded during its transportation to the assembly unit and the metal retained at a temperature where it will pressure weld to the previously formed section against which it will be placed but below its melting temperature.

5. The method defined in claim 4 wherein the metal sections are removed from the casting unit and transported to an assembly unit where they are stacked for pressure welding wherein they are simultaneously inductively heated and electromagnetically conveyed at least in part during their transport from the casting unit to the layering unit.

6. The method defined in claim 1 in which the thickness of the consolidated product may be selectively increased by additionally supplying multiple sections from a secondary casting unit and assembling said additional multiple sections with those from the primary casting unit and consolidating the additional sections in the same body with the sections from the first casting unit in said common pressure welding unit.

7. The method defined in claim 1 in which the casting unit initially produces a thin, wide, flat continuous strand that is then severed into a plurality of separate sections which are then assembled and integrated.

8. The method defined in claim 7 wherein the thin, wide, flat continuous strand is severed transversely of its length into separate sections.

9. The method defined in claim 8 in which each section is at least the length of a single layer in the assembly forming the consolidated product.

10. The method defined in claim 7 in which each section is a multiple of the length of a layer in the said assembly and said multiple length section is folded end-over-end in being assembled and consolidated into a product formed of several layers.

11. The method defined in claim 7 in which the continuous strand is severed lengthwise into multiple sections which are layered one upon another.

12. The method defined in claim 11 in which the continuous strand is severed lengthwise and crosswise into multiple sections of predetermined length and which are then simultaneously assembled into a unitary body of predetermined length and width, with all of the layers in each body so assembled pressure welded to each other into an integrated unit, removing each said integrated body when completed and forming another.

13. The method defined in claim 1 in which a nonoxidizing atmosphere is maintained about the casting unit, the assembling of the layers and the pressure welding unit.

14. Apparatus for converting molten metal into a product for subsequent conversion into finished products, comprising:

(a) a primary casting unit comprising a moving chill surface and means for supplying to and retaining a pool of molten slag-free metal against said chill surface whereby a layer of rapidly non-laminated solidified metal of substantially uniform fine crystal structure throughout is formed and carried by the chill surface away from the pool;

(b) means for removing the thin layer of metal so formed on the chill surface and transferring it to an assembly unit;

(c) an assembly unit to which the thin layers from the casting unit which are transported to it are stacked in full face-to-face metal contact to form the layers into all metal bodies comprising a predetermined number of layers;

(d) means for maintaining the stacked body at a welding temperature below the melting temperature of the metal;

(e) a common consolidating means for applying pressure to effect pressure welding of the stacked layers into a unitary body comprised of the fine crystal structure of the original layers; and (f) means for removing the bodies so formed after pressure welding has been completed.

15. Apparatus as defined in claim 14 in which the layers so delivered to the assembly unit comprise a succession of separate pieces.

16. Apparatus as defined in claim 14 wherein the casting unit, transporting means and consolidating means are contained in a common enclosure in which a substantially nonoxidizing environment is maintained.

17. Apparatus as defined in claim 14 wherein means is provided for maintaining the sections at a temperature at which pressure welding may be effected between the stacked layers in the assembly unit but below the melting temperature of the metal sections to thereby preserve its original fine crystal structure.

18. Apparatus as defined in claim 14 wherein the primary casting unit is a continuously operating unit in which molten metal is continuously solidified into a thin, wide strand, and means for dividing the strand into sections before they are transferred to the assembly unit.

19. Apparatus as defined in claim 18 in which the means for dividing the thin, wide continuous casting into sections severs the strip longitudinally into a plurality of strips, and the assembly unit is arranged to stack all of said plurality of strips in layered arrangement in a single operation.

20. Apparatus as defined in claim 19 wherein the means for dividing the thin, wide casting into sections is arranged to produce strip sections of different width and uniform lengths and the assembly unit is arranged to stack all of the strips of the same width in successive layers to form bodies of a predetermined number of sections, said pressure welding means being arranged to consolidate the successive layers of the bodies of different widths, and common means for simultaneously discharging all of the bodies after they have accumulated a predetermined number of layers.

21. Apparatus as defined in claim 14 in which the assembly unit and the consolidating means comprises at least one pressure roll arranged to apply pressure to the stack which is being assembled and the assembly means comprises a support for the stack wherein means is provided for effecting relative longitudinal reciprocable travel between the pressure roll and the stack.

22. Apparatus for converting molten metal into billets or slabs comprising:

(a) a vessel for holding a heat of metal to be transformed into billets or slabs;

(b) a casting unit to which said vessel delivers molten metal, said unit comprising a moving, continuously driven chill surface with means for retaining a pool of molten metal supplied from said vessel against the chill surface, said moving chill surface being arranged to constantly contact the pool of metal and remove therefrom a thin layer of metal congealed to its surface when it emerges from the pool as a continuous layer;

(c) the casting unit having means for stripping the layer of congealed metal from the chill surface and dividing it, while it is in a freshly congealed state and still at a high temperature near its congealing temperature, into sections;

(d) means for transferring the sections to a stacking apparatus;

(e) means for receiving and stacking the sections one upon another in full face-to-face metal contact in a plurality of layers of predetermined thickness;

(f) a common pressure welding unit in which the sections so stacked are pressure welded into uniform bodies; and (g) said means for transferring the sections to the stacking apparatus being arranged to effect such transfer while each section is at a temperature where it will pressure weld to the adjacent layer in the stack but below its melting point.

23. Apparatus as defined in claim 22 wherein the means for dividing the cast layer separates the layer transversely of the direction of its travel into a succession of pieces of uniform length and the stacking means is arranged to layer said pieces into successive multilayered bodies of predetermined length and thickness, the pressure welding means being arranged to pressure weld each layer after the first one to the preceding one as the stacking of the layers is effected.

24. Apparatus as defined in claim 23 in which the receiving and stacking apparatus comprises a reciprocable bedplate.

25. Apparatus as defined in claim 23 in which the reciprocable bed-plate has a heat insulating insert on which the stack is layered.

26. Apparatus as defined in claim 23 in which the transfer means comprises also means for supplying heat to the successive sections sufficient to assure that each section, when stacked and subjected to pressure welding, will be at a temperature where it will pressure weld to the preceding layer but below a liquidus temperature.

27. Apparatus as defined in claim 22 in which the stacking and pressure welding unit are combined into a single apparatus having opposed platens, one of which is movable toward and away from the other.

* * * * *